United States Patent [19]
Tateishi et al.

[11] Patent Number: 5,999,503
[45] Date of Patent: Dec. 7, 1999

[54] FOCUS CONTROL APPARATUS IN MULTI-LAYERED DISK READING APPARATUS UTILIZING ACCELERATION, DECELERATION AND FOCUS ERROR SIGNALS TO SWITCH BETWEEN LAYERS OF THE DISK

[75] Inventors: Kiyoshi Tateishi; Masakazu Ogasawara, both of Tsurugashima, Japan

[73] Assignee: Pioneer Electronic Corporation, Tokyo, Japan

[21] Appl. No.: 08/698,797

[22] Filed: Aug. 16, 1996

[30] Foreign Application Priority Data

Sep. 7, 1995 [JP] Japan ................................ 7-255669
Apr. 26, 1996 [JP] Japan ................................ 8-130791

[51] Int. Cl.$^6$ ................................................. G11B 7/095
[52] U.S. Cl. ........................ 369/44.29; 369/54; 369/94
[58] Field of Search ....................... 369/44.11, 44.25, 369/44.26, 44.27, 44.29, 54, 58, 94

[56] References Cited

U.S. PATENT DOCUMENTS 5,263,011 11/1993 Maeda et al. ..................... 369/44.27
5,682,372 10/1997 Yamakawa et al. ................ 369/94
5,754,507 5/1998 Nishikata ........................ 369/44.29

FOREIGN PATENT DOCUMENTS 0717401 6/1996 European Pat. Off. .

*Primary Examiner*—W. R. Young
*Attorney, Agent, or Firm*—Sughrue, Mion, Zinn, Macpeak & Seas, PLLC

[57] ABSTRACT

Focus control apparatus in a reading apparatus for reading a multi-layered disk having information recorded on a plurality of recording surfaces thereof. The focus control apparatus includes a signal generating system for generating an acceleration signal for forcing the objective lens to move in the optical axis direction of the light beam and a deceleration signal for braking the objective lens which has been forced to move. The apparatus further includes control circuit for supplying a lens driving system with the acceleration signal and the deceleration signal as the driving signal in response to a switching instruction for switching a recording surface from which information is to be read, and for supplying the driving system with the focus error signal as the driving signal after the generation of the deceleration signal, to focus the light beam on a target recording surface. The deceleration signal has a parameter which is a function of distance between the recording surface which has been read before the switching instruction is issued and the target recording surface. Preferably, either of the acceleration signal and the deceleration signal is a signal which is compensated for the influence of gravity acting on the objective lens.

11 Claims, 26 Drawing Sheets

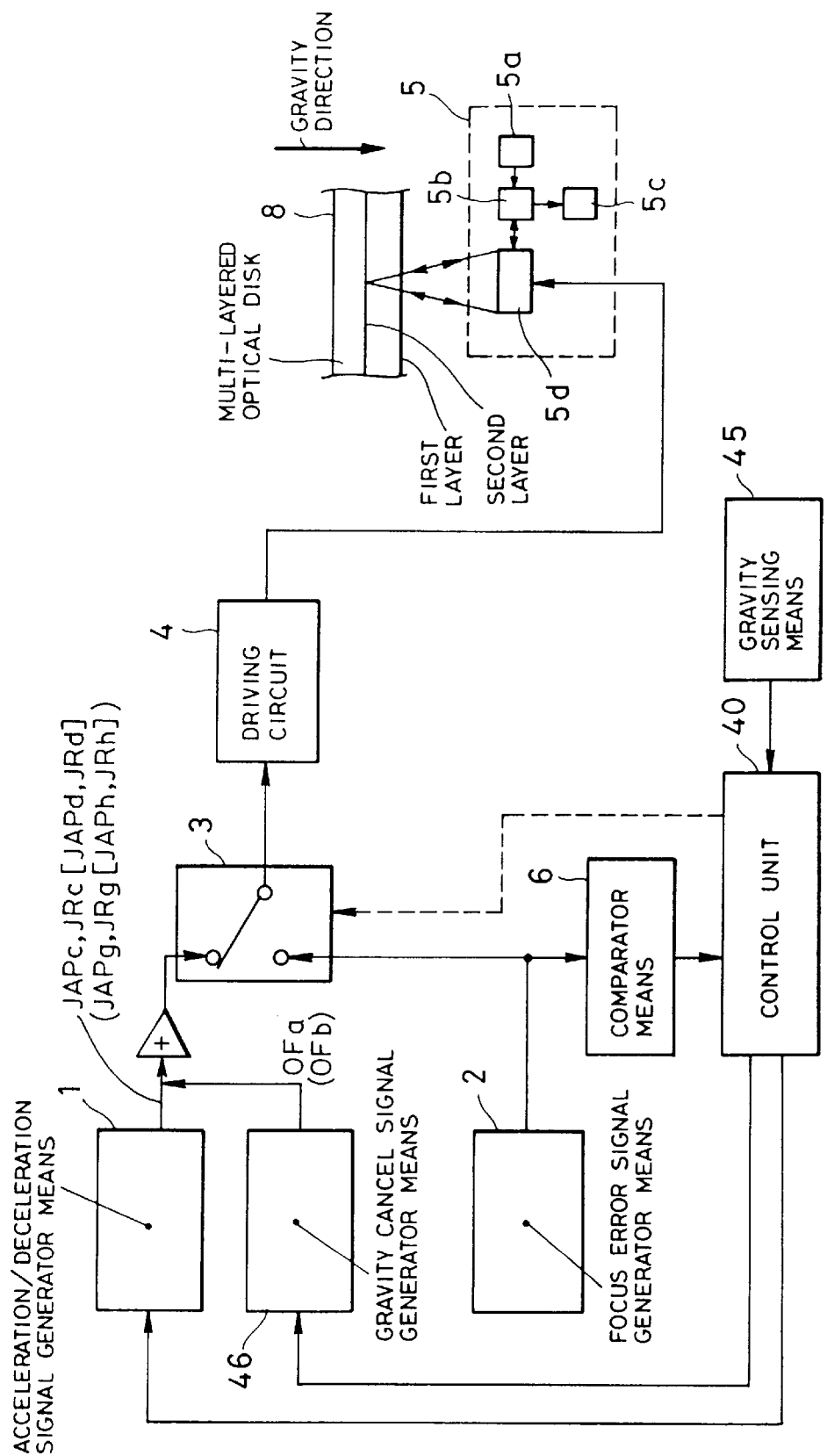

FOCUS CONTROL APPARATUS IN MULTI-LAYERED DISK READING APPARATUS UTILIZING ACCELERATION, DECELERATION AND FOCUS ERROR SIGNALS TO SWITCH BETWEEN LAYERS OF THE DISK

BACKGROUND OF THE INVENTION

1. Field of the Invention

The present invention relates to a control apparatus for performing a focus servo for a multi-layered optical disk capable of recording information on a plurality of layers, and more particularly, to a focus control apparatus which moves an objective lens of a pickup to converge or focus a light beam on a specified recording surface.

2. Description of the Related Arts

A conventional focus control apparatus for an optical disk will be first described in connection with a compact disk player (hereinafter called the "CD player") as an example.

FIG. 1 is a block diagram illustrating the configuration of a main portion of a conventional focus control apparatus for a CD player.

For performing a focus servo in the illustrated focus control apparatus, a switching means 110 is first controlled by a servo loop control unit 107 to input an output of a saw-tooth-wave generator circuit 105 to a driving circuit 111. The driving circuit 111 supplies an output in accordance with a saw-tooth-wave input thereto to a focus coil arranged in a movable portion, not shown, of a pickup 112 to move an objective lens integrally formed with the focus coil in the directions closer to and away from a disk 113 (in the direction of the optical axis).

A light source arranged in the pickup 112 forms a light spot on the disk 113 through the objective lens. Reflected light of the light spot is transduced into electric signals by a light receiving element 101 divided into regions A–D. Respective outputs from the divided regions of the light receiving element 101 are summed by adders 102, 103, 104 to generate a focus sum signal SUM. On the other hand, a focus error signal FE is generated by the adders 102, 103 and a subtractor 108.

The focus error signal FE is at zero level when a relative distance between the objective lens included in the pickup 112 and the disk 113 is equal to a reference value (i.e., a reference distance), and has a sigmoid characteristic, i.e., its output level continuously varies in accordance with a displacement from the reference distance.

The generated focus sum signal SUM is compared with a reference value THO by a comparator means 106 which outputs an FOK signal to the servo loop control unit 107 when the focus sum signal SUM is equal to or more than a predetermined level. On the other hand, the focus error signal FE is also compared with the reference value (zero level) by a comparator means 109 which supplies the comparison result to the servo loop control unit 107 as an FZ signal.

The focus servo control unit 107 recognizes a zero-cross point of the focus error signal by the FZ signal input thereto, and controls the switching means 110 so as to input the focus error signal to the driving circuit 111 when the focus sum signal is equal to or more than the predetermined level and the focus error signal is zero-crossing, thus forming a focus servo loop composed of the pickup 112, the light receiving element 101, and the driving circuit 111.

When the focus servo loop is formed, the focus error signal FE is compensated for the phase in an equalizer amplifier 114 and then input to the driving circuit 111 through the switching means 110. The driving circuit 111, based on the focus error signal input thereto, supplies the focus coil of the pickup 112 with a driving signal for driving the objective lens included in the pickup 112 so as to always maintain the relative distance between the pickup and the disk at the reference value.

As described above, in the conventional CD player, the objective lens included in the pickup is driven by the focus coil to control the distance between the pickup and the disk to always remain constant.

On the other hand, increasingly larger recording capacities have been required for recording media in recent years. To meet this requirement, there has been proposed a multi-layer structure disk having a first and second reflective layers each serving as a recording surface (reflective surface), on which information data is recorded, to increase a recording density. In such a two-layered optical disk, the first reflective layer is formed as a translucent film made of a dielectric material.

For reading such a multi-layer structure optical disk, it is necessary to reliably perform a focus servo on either of the first and second reflective surfaces in response to instructions.

OBJECT AND SUMMARY OF THE INVENTION

It is therefore an object of the present invention to provide a focus control apparatus which is capable of reliably converging or focusing incident light on a recording surface from which information is to be read for reading a multi-layered optical disk having a plurality of information recording layers.

It is another object of the present invention to provide a focus control apparatus which is capable of reliably converging incident light on a recording surface from which information is to be read, even with a multi-layered optical disk having a varying interval between recording surfaces.

It is a further object of the present invention to provide a focus control apparatus which is capable of canceling the influence of gravitational acceleration exerted on an objective lens to reliably converge incident light on a recording surface from which information is to be read.

According to one aspect of the present invention, there is provided a focus control apparatus in a reading apparatus for reading a multi-layered disk having information recorded on a plurality of recording surfaces thereof, which is characterized by comprising: an objective lens for converging a light beam emitted from a light source on either of the recording surfaces; driving means for moving the objective lens in an optical axis direction of the light beam in accordance with a driving signal; light receiving means for receiving the light beam reflected from the multi-layered optical disk, focus error detector means for detecting a focus error of the light beam with respect to the recording surface on the basis of a light receiving output of the light receiving means to generate a focus error signal; signal generator means for generating an acceleration signal for forcing the objective lens to move in the optical axis direction of the light beam and a deceleration signal for braking the objective lens which has been forced to move; and control means for supplying the driving means with the acceleration signal and the deceleration signal as the driving signal in response to a switching instruction for switching a recording surface from which information is to be read, and for supplying the driving means with the focus error signal as the driving signal after the generation of the deceleration signal, to converge the light beam on a target recording surface, wherein the deceleration signal is a signal in accordance with the distance between a recording surface which has been read before the switching instruction is issued and the target recording surface.

According to another aspect of the present invention, there is provided a focus control apparatus in a reading apparatus for reading a multi-layered disk having information recorded on a plurality of recording surfaces thereof, which is characterized by comprising: an objective lens for converging a light beam emitted from a light source on either of the recording surfaces; driving means for moving the objective lens in an optical axis direction of the light beam in accordance with a driving signal; light receiving means for receiving the light beam reflected from the multi-layered optical disk; focus error detector means for detecting a focus error of the light beam with respect to the recording surface on the basis of a light receiving output of the light receiving means to generate a focus error signal; signal generator means for generating an acceleration signal for forcing the objective lens to move in the optical axis direction of the light beam and a deceleration signal for braking the objective lens which has been forced to move; and control means for supplying the driving means with the acceleration signal and the deceleration signal as the driving signal in response to a switching instruction for switching a recording surface from which information is to be read, and for supplying the driving means with the focus error signal as the driving signal after the generation of the deceleration signal, to converge the light beam on a target recording surface, wherein at least one of the acceleration signal and the deceleration signal is a signal which is compensated for the influence of the gravity acting on the objective lens.

BRIEF DESCRIPTION OF THE DRAWINGS

FIG. 27 is a schematic block diagram illustrating a focus control apparatus according to a further embodiment of the present invention.

DETAILED DESCRIPTION OF THE EMBODIMENTS

First, a basic idea of the present invention will be described.

Figure 1:
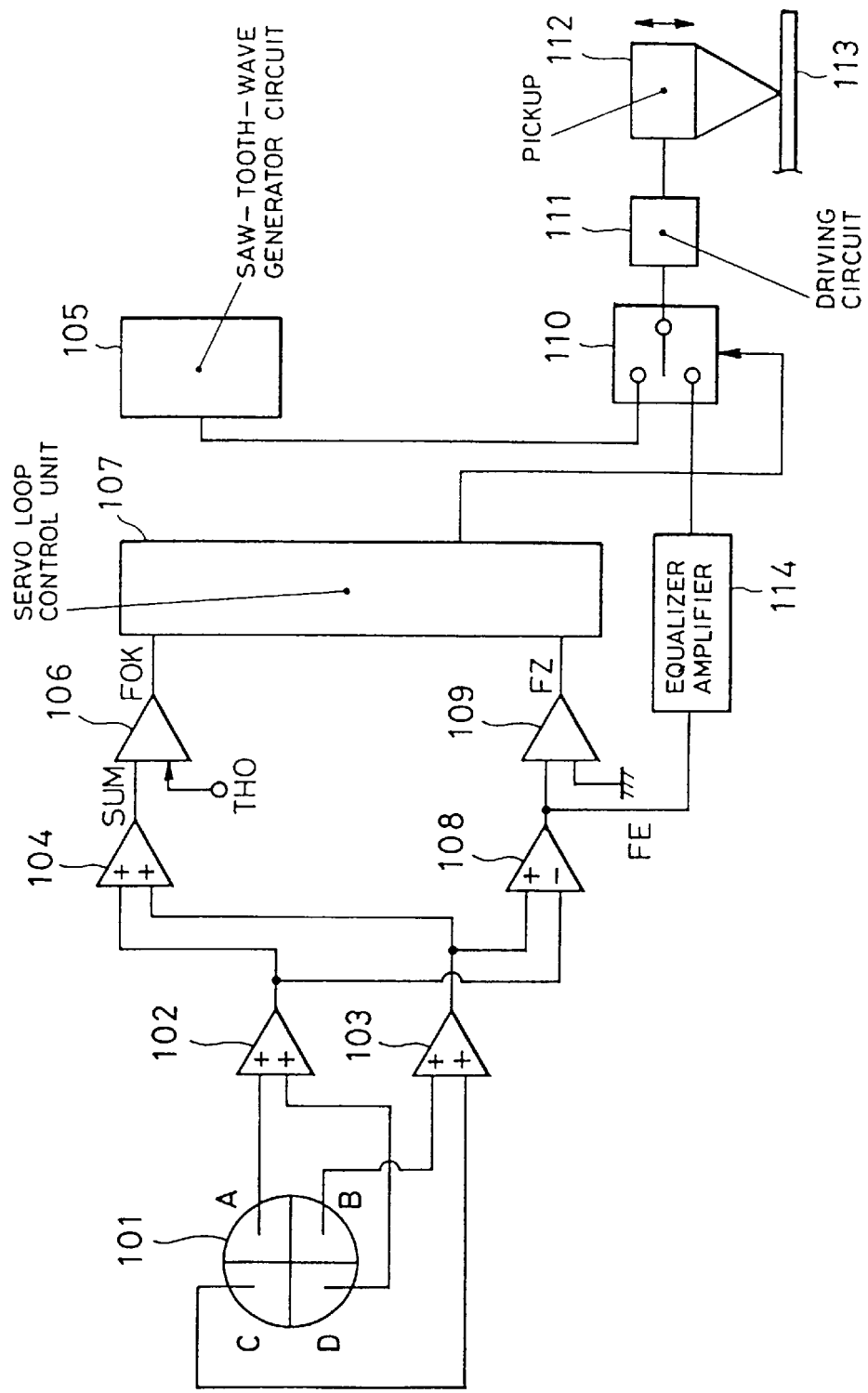
FIG. 1 is a block diagram illustrating the configuration of a main portion of a conventional focus control apparatus for a CD player.
Figure 2:
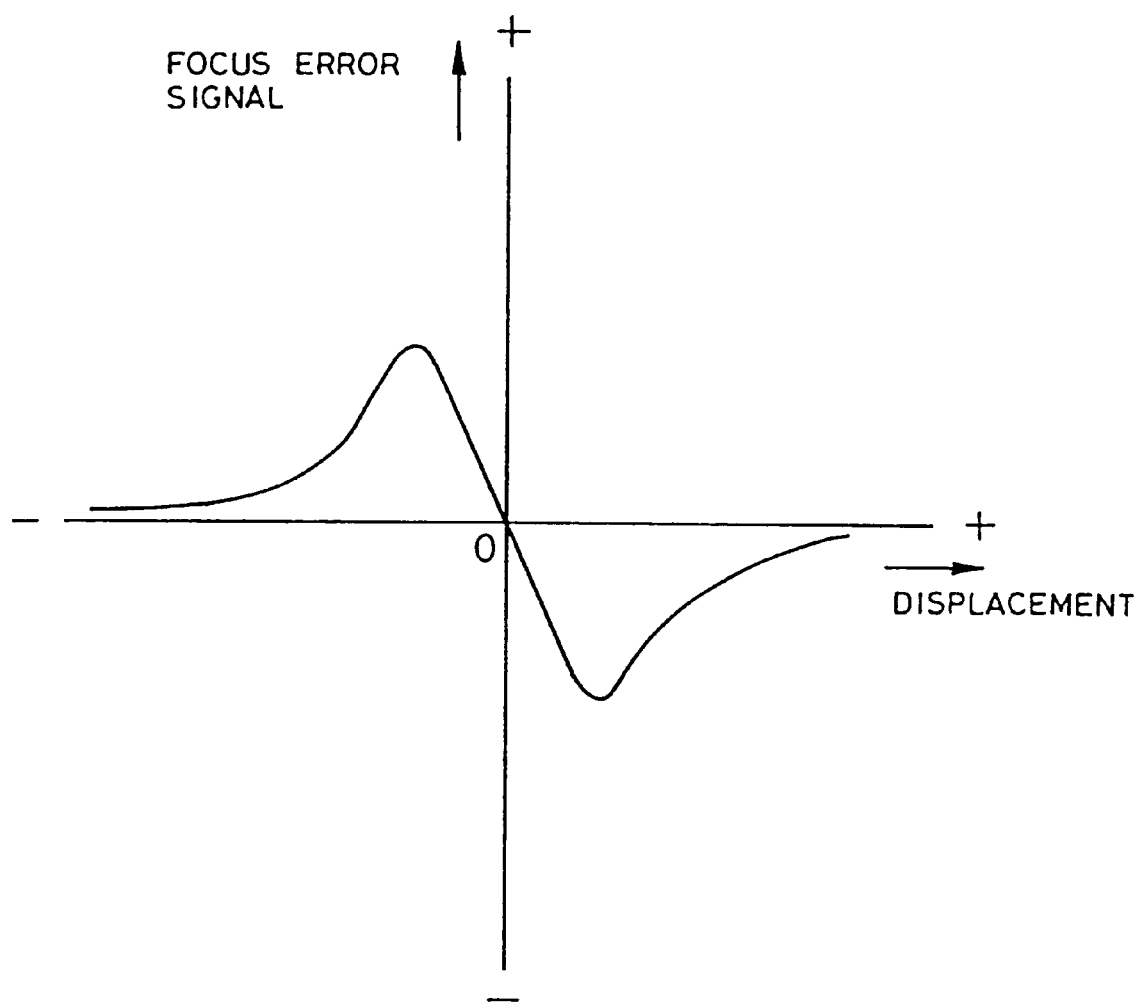
FIG. 2 illustrates a sigmoid characteristic of a focus error signal generated by the conventional focus control apparatus for a CD player.
Figure 3:
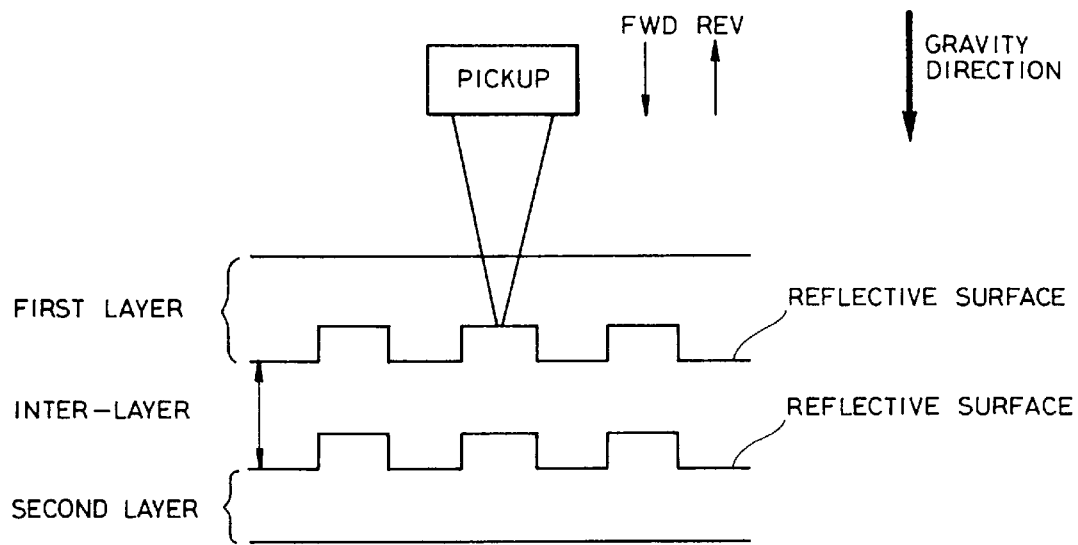
FIG. 3 is a schematic cross-sectional view illustrating the structure of a two-layered optical disk.

Referring to FIG. 3 as an example, for switching a reading operation from a first layer to a second layer, it is necessary to move an objective lens of a pickup between the layers to perform a focus servo on a reflective surface of the second layer. This is a new focus control which has not been encountered in conventional focus control apparatuses for a compact disk.

Further, with the above-mentioned multi-layered structure optical disk, it is necessary to cope with variations in inter-layer distance, i.e., the distance between a recording surface of a first layer and a recording surface of a second layer when the objective lens of the pickup is moved due to a change of a reflective layer from which information is to be read.

In the example of FIG. 3, the inter-layer thickness between the first layer and the second layer inevitably varies from a standard value. If the objective lens of a pickup were moved between the layers without taking into account the variations in inter-layer distance, a focus servo cannot be correctly carried out to converge incident light on a reflective layer from which information is to be read. In the worst case, the objective lens of the pickup could collide with the optical disk when the focus servo is performed to position a reading point of the pickup the second layer.

Likewise, as illustrated in FIG. 3, a moving direction of the objective lens with respect to the direction of the gravitational acceleration G applied to the objective lens is different when a reading operation is switched from the first layer to the second layer and when switched from the second layer to the first layer. Therefore, even if the inter-layer distance does not at all vary, a driving force for appropriately moving the objective lens must be set in consideration of the gravitational acceleration.

Figure 4:
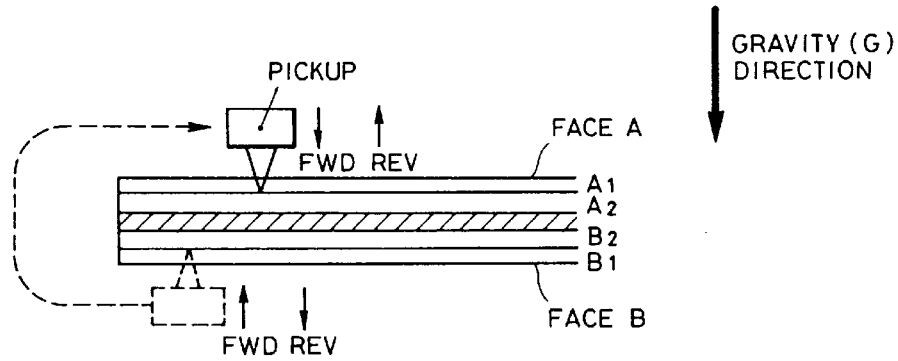
FIG. 4 is a schematic cross-sectional view illustrating the structure of a double-surface two-layered structure optical disk.

The present invention has been made also in consideration of a multi-layered structure disk, as illustrated in FIG. 4, on which information is read from both of front and back surfaces. This disk has first and second layers A1, A2 from which information is read through a face A on the front side and first and second layers B1, B2 from which information is read through a face B on the back side. For reading information from this disk, it may be thought to move the pickup to the opposite side to read information from a recording layer thereon without turning over the disk. In this case, the gravitational acceleration G acting on the objective lens when the focus thereof is moved from one layer to the other is in the opposite directions relative to the objective lens when the layers A1, A2 on the face A are read and when the layers B1, B2 on the face B are read. Therefore, in such a case, a driving force must be set for the objective lens depending on which surface the pickup is facing.

The present invention has been made in view of a variety of problems inherent in the focus servo for the multi-layered structure disk as mentioned above.

Now, embodiments of the present invention will be described in detail with reference to the accompanying drawings.

Figure 5:
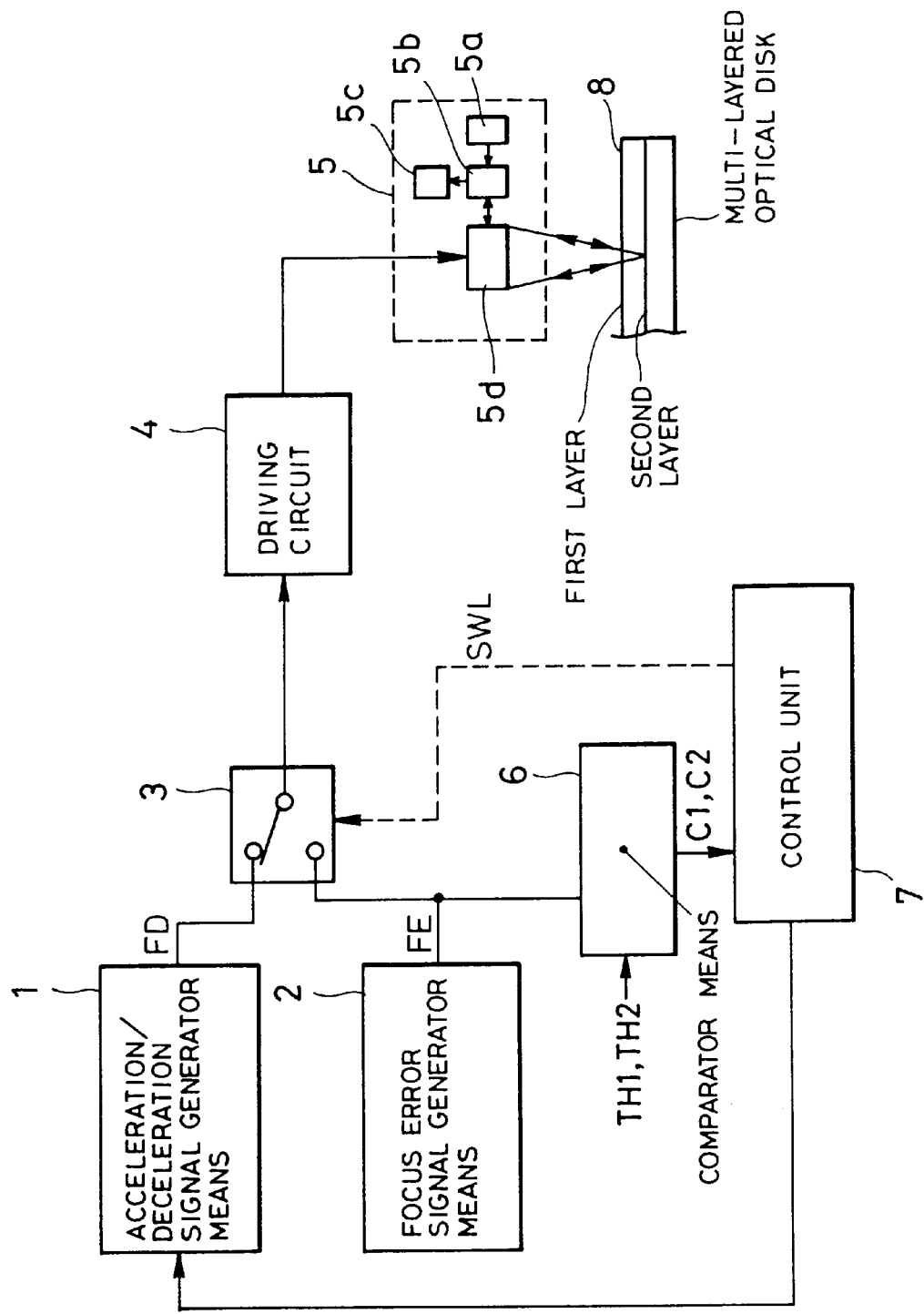
FIG. 5 is a schematic block diagram illustrating a focus control apparatus according to a first embodiment of the present invention.

FIG. 5 is a schematic block diagram illustrating a focus control apparatus according to a first embodiment of the present invention. Referring specifically to FIG. 5, the focus control apparatus comprises an acceleration/deceleration signal generator means 1, a focus error signal generator means 2, a signal selector means 3, a driving circuit 4, a pickup 5, a comparator means 6 for comparing the focus error signal with a reference level, and a control unit 7. The pickup 5 comprises a light source 5a, an optical unit 5b, a light receiving system 5c, and a driving unit 5d. Also, the driving unit 5d has an integrally formed objective lens with a focus coil, not shown, which are arranged for displacement, or to be movable, in a direction perpendicular to the surface of a multi-layered disk 8 (a focus direction or light axis direction).

The acceleration/deceleration signal generator means 1, controlled by the control unit 7, generates an acceleration signal for moving the objective lens arranged in the pickup 5 and a deceleration signal for decreasing a moving speed of the objective lens which is moving in response to the acceleration signal.

The focus error signal generator means 2 generates a focus error signal based on a relative distance between the multi-layered optical disk 8 and the objective lens included in the pickup 5 with reference to an output of the light receiving system 5c which receives reflected light from the multi-layered optical disk 8 through the optical unit 5b.

The signal selector means 3, controlled by the control unit 7, selects the acceleration/deceleration signal or the focus error signal as required.

The driving circuit 4 generates a driving signal for driving the driving unit 5d of the pickup 5 in the focus direction on the basis of a signal selected by the signal selector means 3.

The pickup 5 optically processes light (for example, laser light) emitted from the light source 5a by using the optical unit 5b, and then irradiates a recording surface of the multi-layered disk 8, from which information is to be read, through the objective lens in the driving unit 5d. During the irradiation, the focus coil and the objective lens are integrally moved in the focus direction in accordance with the driving signal supplied from the driving circuit 4 to form a light spot converging on the recording surface. The reflected light from the multi-layered optical disk 8 is received by the light receiving system 5c through the objective lens and the optical unit 5b. Information recorded on the multi-layered optical disk 8 is read based on a light receiving output of the light receiving system 5c.

The comparator means 6 compares the focus error signal output from the focus error signal generator means 2 with a reference level and outputs the comparison result to the control unit 7.

The control unit 7 manages the controls for respective components based on information reproduced from the multi-layered optical disk 8 or based on a read layer switching instruction, not shown, input thereto from the user. Specifically, the control unit 7 controls output timing, output level, and output duration of the deceleration signal based on the comparison result presented by the comparator means 6, as well as controls output timing and output duration of the acceleration signal and the timing for selecting the focus error signal or the acceleration/deceleration signals.

Next, the processing of the control unit 7 when switching a layer, from which information is read, from one layer to the other of a two-layered optical disk will be described in connection with an exemplary multi-layered optical disk comprising two recording layers as illustrated in FIG. 3.

First, description will be made for the case where a reading operation is switched from a first layer to a second layer of the two-layered optical disk.

Figure 6:
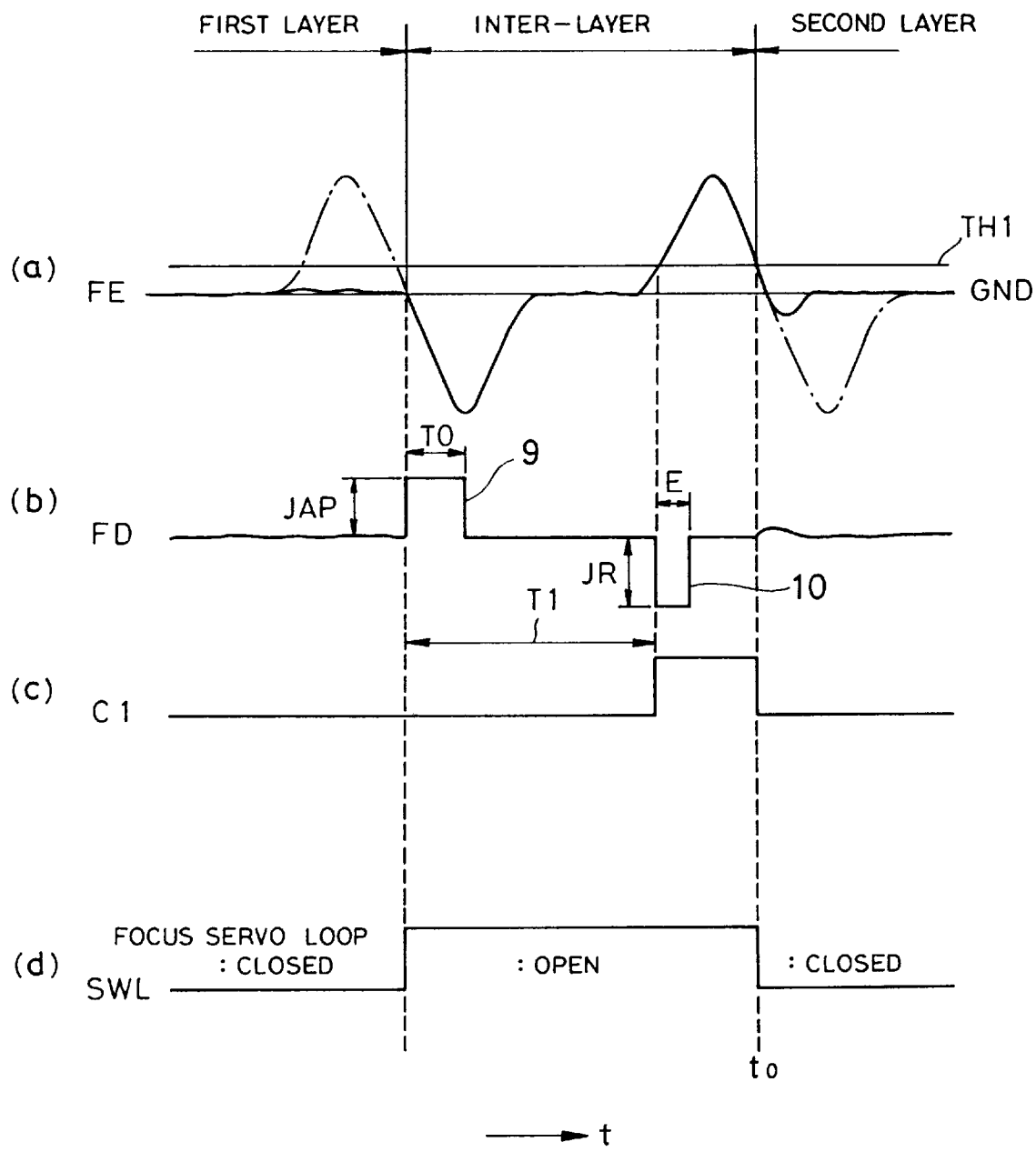
FIGS. 6(a–d) illustrates waveforms at a variety of positions in a reproducing apparatus employing the focus control apparatus according to the first embodiment of the present invention when a reading operation is switched from a first layer to a second layer by an instruction.

FIGS. 6(a–d) illustrates waveforms at a variety of positions in the focus control apparatus when the pickup proceeds to read to the second layer, while reading information from the first layer, in response to an instruction.

In this event, the control unit 7 first controls a selection signal SWL to transition to high level in order to instruct the signal selector means 3 to supply an output signal of the acceleration/deceleration signal generator means 1 to the driving circuit 4.

This switching control prevents the signal selector means from supplying the focus error signal generated based on a relative distance between the first layer recording surface and the objective lens of the pickup 5 to the driving circuit 4, thus opening a focus servo loop.

The control unit 7, simultaneously with the control of the selection signal SWL to high level, controls the acceleration/ deceleration signal generator means 1 in the following manner. The acceleration/deceleration signal generator means 1, under the control of the control unit 7, outputs an acceleration pulse 9 having a predetermined positive polarity level JAP, as indicated in a signal FD in FIG. 6, for a predetermined duration T0.

The output acceleration pulse 9 is supplied to the driving circuit 4 through the signal selector means 3, so that the driving circuit 4 moves the objective lens of the pickup 5 in the direction toward the multi-layered optical disk 8.

Also, the comparator means 6 compares the focus error signal FE generated when the objective lens of the pickup 5 moves closer to the disk 8 with a reference level TH1, and outputs a signal C1 indicative of the comparison result to the control unit 7.

The control unit 7 detects, from the signal C1 transitioning to high level, that the focus error signal FE based on a relative distance between the second layer recording surface and the objective lens of the pickup 5 has begun to exhibit a sigmoid wave, and controls the acceleration/deceleration signal generator means 1 to output a deceleration pulse 10 as indicated in the signal FD in FIG. 6.

Here, the focus error signal has an indefinite region between a first sigmoid wave and a second sigmoid wave, the first sigmoid wave being generated based on the relative distance between the first layer recording surface and the objective lens of the optical pickup 5, the second sigmoid wave being generated based on the relative distance between the second layer recording surface and the objective lens of the optical pickup 5.

Also, in each sigmoid wave, the focus error signal is at zero level when the relative distance between the objective lens of the pickup 5 and the associated recording surface is at a reference value (i.e., a reference distance), and the level of the focus error signal continuously increases or decreases in accordance with a displacement from the reference distance centered on this zero level. In an inter-layer zone between the first and second layer recording surfaces, the level of the focus error signal presents opposite polarities on one and the other sides of the indefinite region.

Thus, in the first embodiment, a predetermined value having a level other than the zero level and the polarity opposite to the latter level (negative polarity) of the sigmoid wave in the focus error signal associated with the first layer recording surface, which appears with the movement of the objective lens of the pickup 5 in the direction from the first layer to the second layer, is set as the comparison reference level TH1 of the comparator means 6 in order to detect that the focus error signal begins to present a sigmoid wave associated with the second layer recording surface.

The acceleration/deceleration signal generator means 1 outputs a deceleration pulse 10 having the polarity opposite to that of the acceleration pulse 9 under the control of the control unit 7 which has received the comparison result (C1) of the comparator means 6. This causes the deceleration pulse 10 to be supplied to the driving circuit 4 through the signal selector means 3, so that the movement of the objective lens of the pickup 5 is braked to decelerate its moving speed.

In this way, the deceleration pulse 10 is supplied to the objective lens driving system in an initial stage of the generation of the sigmoid wave in the focus error signal associated with the second layer recording surface, so that the objective lens of the pickup 5 is braked sufficiently before a zero-cross point of the sigmoid wave is encountered, thus eliminating a problem that the objective lens cannot focus a light beam on the second layer recording surface but instead focuses at a position beyond the second layer recording surface, causing the focus servo to fail. It is therefore possible to avoid having the objective lens of the pickup 5 collide with the multi-layered optical disk 8.

Also, the deceleration pulse 10 output by the acceleration/ deceleration signal generator means 1 is desirably set corresponding to an inter-layer thickness. In the first embodiment, when a reading operation is switched from the first layer to the second layer, a time period T1, as indicated in the waveform of the signal C1 in FIG. 6, which extends from the time the selection signal SWL goes high to the time the comparator means 6 recognizes that the generation of the sigmoid wave in the focus error signal FE has begun in association with the second layer recording surface, is measured as a parameter indicative of the inter-layer thickness of a loaded disk, and a peak level JR of the deceleration pulse 10 is set in accordance with the measured time period T1. The duration for the deceleration pulse 10 is set for a predetermined time period E.

By thus setting the peak level of the deceleration pulse 10, the focus servo can be reliably performed to position the pickup 5 above the second layer recording surface even if the player is loaded with a disk having an inter-layer thickness extremely larger (or smaller) than a standard value of disks.

The objective lens of the pickup 5 decelerated by the deceleration pulse 10 slowly approaches to the multi-layered optical disk 8. Also, with the movement of the objective lens of the pickup 5, the level of the focus error signal FE, although gradually continuing to increase even after reaching the threshold value TH1, begins to decrease after passing a maximum value.

The focus error signal FE begins to decrease and again reaches the comparison reference level TH1 of the comparator means 6 (at time t0). The control unit 7 determines from the output of the comparator means 6 that the level of the focus error signal FE has decreased below the reference level, and controls the selection signal SWL to transition to low level such that the signal selector means 3 supplies the driving circuit 4 with an output signal of the focus error signal generator means 2.

This switching control of the selection signal SWL to low level causes the focus error signal FE generated based on the relative distance between the second layer recording surface and the objective lens of the pickup 5 to be supplied to the driving circuit 4 thus closing the focus servo loop.

In response to the closure of the focus servo loop, the driving circuit 4 outputs a driving signal to the focus coil integrally formed with the objective lens of the pickup 5, so as to always maintain the focus error signal FE at zero level, i.e., so as to control the objective lens to focus on the second layer recording surface.

Afterward, the relative distance between the objective lens of the pickup 5 and the multi-layered optical disk 8 is controlled by the focus servo loop formed by the focus error signal generator means 2, the driving circuit 4, and the pickup 5 to read information recorded on the second layer recording surface.

While the timing (to) at which the selection signal SWL is transitioned from high level (for opening the focus servo loop) to low level (for closing the focus servo loop) is set at the timing at which the level of the focus error signal FE falls to TH1, the timing (to) may be set for any time after the deceleration pulse 10 has ended.

Next, description will be made for the case where a reading operation is switched from the second layer to the first layer of the two-layered optical disk.

Figure 8:
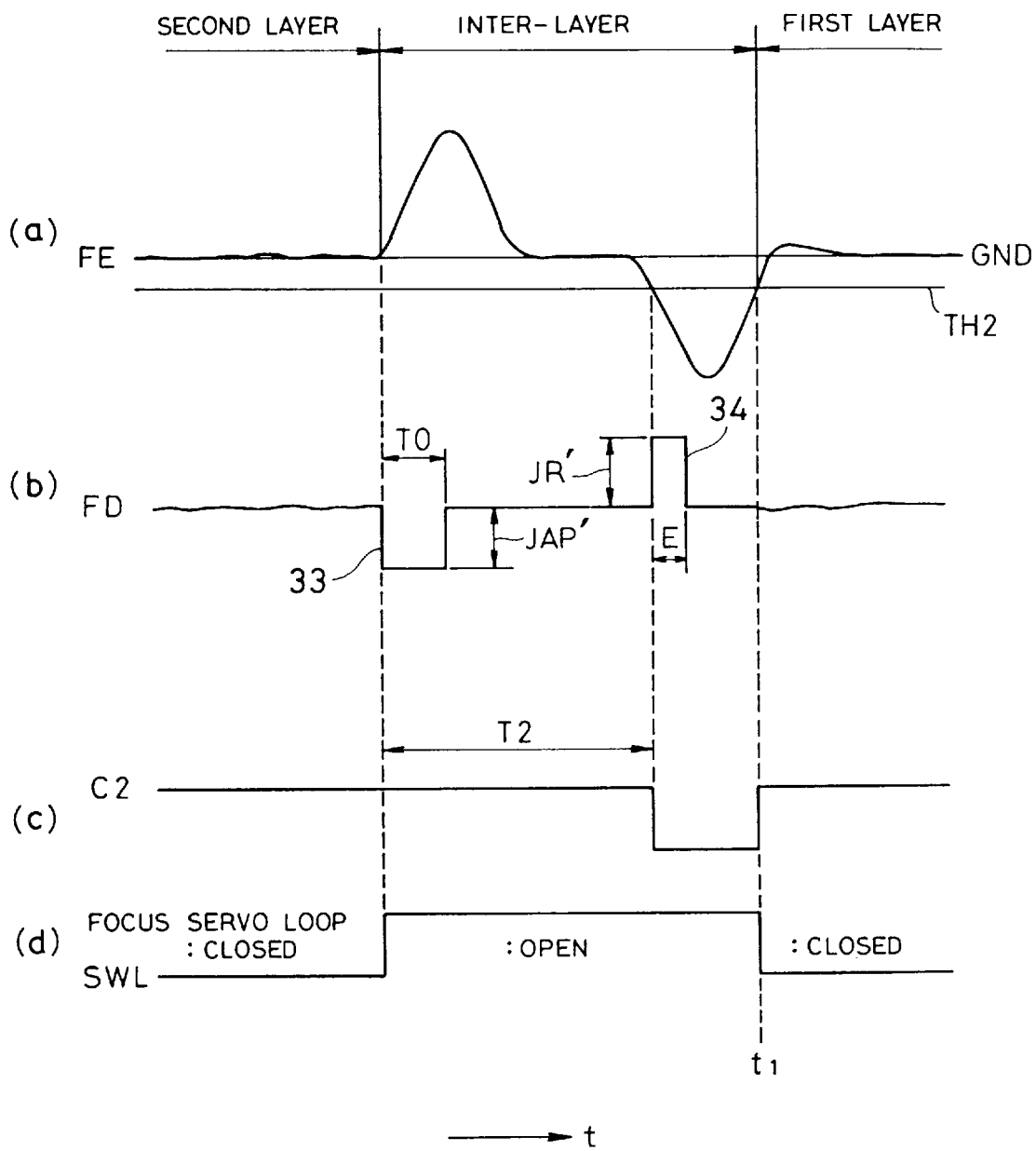
FIGS. 8(a–d) illustrates waveforms at a variety of positions in the reproducing apparatus employing the focus control apparatus according to the first embodiment of the present invention when a reading operation is switched from the second layer to the first layer by an instruction.

FIGS. 8(a–d) illustrates waveforms at a variety of positions while the pickup is proceeding to read to the first layer after reading information from the second layer, in response to an instruction.

In this case, the control unit 7 controls the selection signal SWL to transition to high level in order to supply an output signal of the acceleration/deceleration signal generator means 1 to the driving circuit 4, as is the aforementioned case of switching the reading operation from the first layer to the second layer. This switching control prevents the signal selector means 3 from supplying the focus error signal generated based on the relative distance between the second layer recording surface and the objective lens of the pickup 5 to the driving circuit 4, thus opening the focus servo loop.

Simultaneously with this processing, the acceleration/deceleration signal generator means 1 is controlled by the control unit 7.

The acceleration/deceleration signal generator means 1, under the control of the control unit 7, outputs an acceleration pulse 33 having the polarity opposite to that of the acceleration pulse 9 for a predetermined duration T0 as indicated in the waveform of the signal FD in FIG. 8. The acceleration pulse 33 is supplied to the driving circuit 4 through the signal selector means 3, so that the objective lens of the pickup 5 is moved in the direction away from the multi-layered optical disk by the driving circuit 4.

Then, the comparator means 6 compares the focus error signal FE with a reference level TH2, and outputs a signal C2 indicative of the comparison result to the control unit 7. The control unit 7, in response to the signal C2 transitioning to low level, detects from the movement of the objective lens of the pickup 5 away from the disk 8 that the focus error signal generator means 2 has begun to generate the focus error signal FE in a sigmoid waveform based on the relative distance between the first layer recording surface and the objective lens of the pickup 5.

The comparison reference level TH2 of the comparator means 6, similar to the foregoing comparison reference level TH1, is set to a predetermined value having a level other than zero-level and a polarity opposite to the reference level TH1 (positive polarity) of the sigmoid wave in the focus error signal associated with the second layer recording surface appearing in the inter-layer zone.

The control unit 7, in response to the detection of the sigmoid wave in the focus error signal based on the relative distance between the first layer recording surface and the objective lens of the pickup 5, controls the acceleration/deceleration signal generator means 1 to output a deceleration pulse 34.

A peak level JR' of the deceleration pulse 34 output from the acceleration/deceleration signal generator means 1 is set in correspondence to the inter-layer thickness, as in the case of the deceleration pulse 10. A time period T2, which extends from the time the selection signal SWL goes high to the time the comparator means 6 recognizes that the generation of the sigmoid wave in the focus error signal FE has begun in association with the first layer recording surface, is measured and used as a parameter indicative of the inter-layer thickness. Also, the deceleration pulse 34 output from the acceleration/deceleration signal generator means 1 has a polarity opposite to that of the acceleration pulse 33.

The objective lens of the pickup 5, decelerated by the deceleration pulse 34, slowly moves away from the optical disk 8. With the movement of the objective lens of the pickup 5, the level of the focus error signal FE, although gradually continuing to decrease even after reaching the threshold value TH2, begins to increase after passing a minimum value.

The focus error signal FE begins to increase and again reaches the comparison reference level TH2 of the comparator means 6 (at time t1). The control unit 7 determines from the output of the comparator means 6 that the level of the focus error signal FE has increased beyond the reference level, and sets the selection signal SWL to low level such that the signal selector means 3 supplies the output signal of the focus error signal generator means 2 to the driving circuit 4.

The switching control of the selection signal SWL to low level causes the signal selector means 3 to supply the focus error signal FE generated based on the relative distance between the first layer recording surface and the objective lens of the pickup 5 to the driving circuit 4, thus closing the focus servo loop.

In response to the closure of the focus servo loop, the driving circuit 4 outputs a driving signal to the focus coil of the driving unit 5d, so as to always maintain the focus error signal FE at zero level, i.e., so as to control the objective lens to focus on the first layer recording surface.

Afterward, the relative distance between the objective lens of the pickup 5 and the multi-layered optical disk 8 is controlled by the focus servo loop formed by the focus error signal generator means 2, the driving circuit 4, and the pickup 5 to read information recorded on the first layer recording surface.

It should be noted that the timing at which the focus servo loop is closed in this case may be set for any time after the deceleration pulse 34 has ended, as in the case of FIG. 6.

Next, the configuration of the respective components in FIG. 5 will be described.

Figure 9:
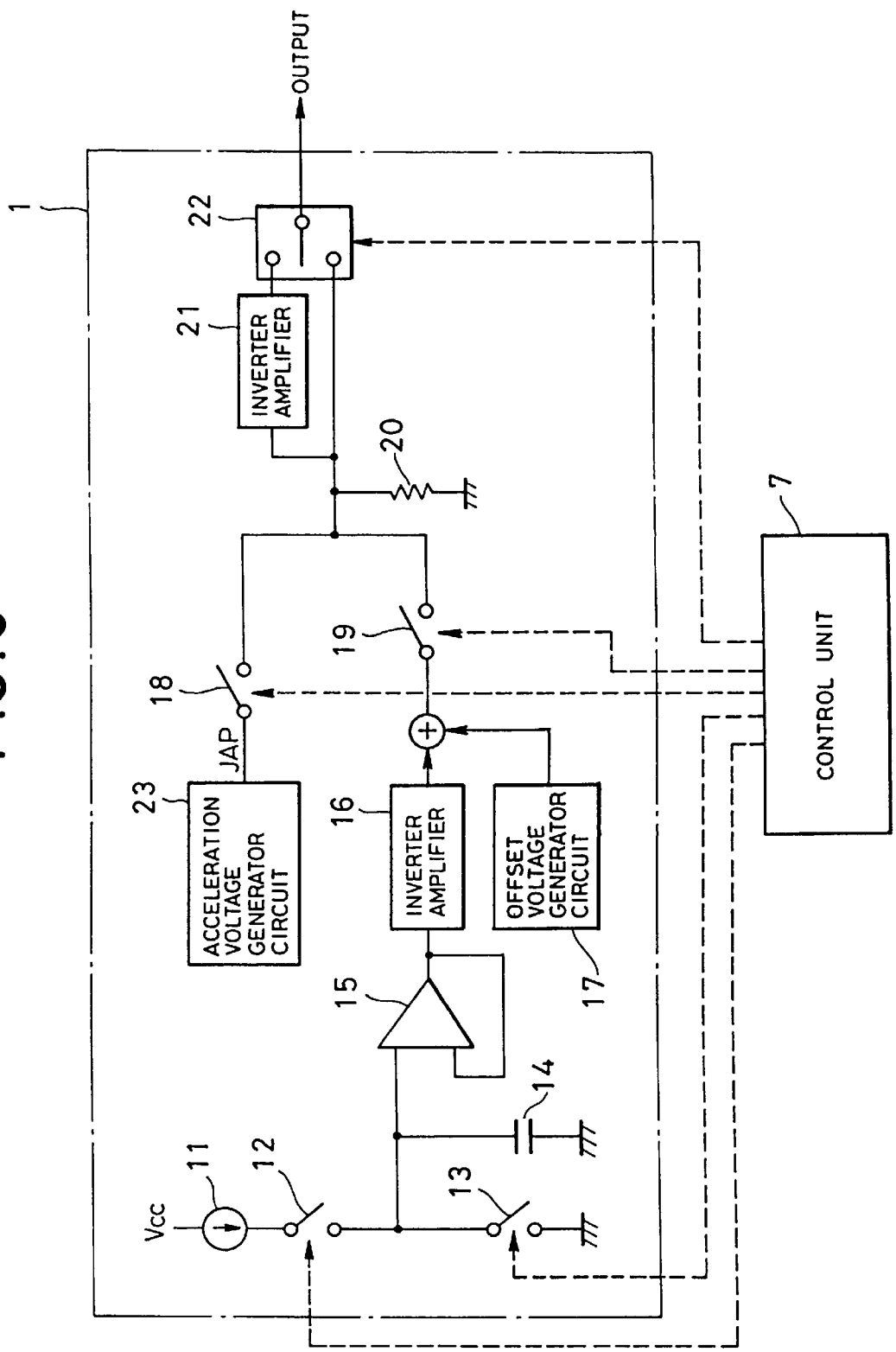
FIG. 9 is a block diagram illustrating the configuration of a acceleration/deceleration signal generator means in the focus control apparatus according to the first embodiment of the present invention.

First, the configuration of the acceleration/deceleration signal generator means 1 is illustrated in FIG. 9.

In FIG. 9, the acceleration/deceleration signal generator means 1 comprises an acceleration voltage generator circuit 23, an independent current source 11, switches 12, 13, 18, 19, a capacitor 14, a buffer amplifier 15, inverter amplifiers 16, 21, an offset voltage generator circuit 17, a resistor 20, and a selector switch 22.

The control unit 7 controls the respective switches 12, 13, 18, 19 and the selector switch 22 to have the acceleration/deceleration signal generator means 1 generate appropriate acceleration and deceleration signals.

Now, the operations of the respective components performed when a reading operation is switched from the first layer to the second layer will be described with reference FIG. 6.

First, the control unit 7 opens the switch 12 and closes the switch 13 for a predetermined time period to discharge charges held on the capacitor 14.

Subsequently, the control unit 7 closes the switches 12, 18, opens the switches 13, 19, and sets the selector switch 22 to select an input signal of the inverter amplifier 21. As a result, an output signal of the acceleration voltage generator circuit 23 is led out through the switch 18 and the selector switch 22 as the output of the acceleration/deceleration signal generator means 1. Then, the control unit 7 maintains the switch 18 in a closed state for the time period T0 to generate the acceleration pulse 9 as illustrated in FIG. 6.

When the objective lens of the pickup 5 is moving closer to the multi-layered optical disk in accordance with the acceleration pulse 9, a current from the current source 11 is supplied to the capacitor 14 to gradually increase a voltage between both terminals of the capacitor 14.

Thus, an output signal of the buffer amplifier 15 which is supplied with the voltage between the terminals of the capacitor 14 as an input presents its level increasing with the lapse of time.

The output signal of the buffer amplifier 15, after inverted by the inverter amplifier 16, is added to an offset voltage output from the offset voltage generator circuit 17.

Since the addition output is equal to a value generated by subtracting the output signal value of the amplifier 15 from the offset voltage, the level of the addition output gradually decreases with the lapse of time with the offset voltage being its maximum value.

As the objective lens of the pickup 5 is further moving closer to the disk 8, when the comparator means 6 detects a rising trend of a sigmoid wave in the focus error signal associated with the second layer recording surface, the control unit 7 opens the switch 12, closes the switch 19, and controls the selector switch 22 to select an output signal of the inverter amplifier 21.

By the control described above, the signal JR having a level in accordance with the time T1 until the comparator means 6 detects the rising trend of the sigmoid wave in the focus error signal associated with the second layer recording surface, as illustrated in FIG. 6, is output through the selector switch 22.

The control unit 7 closes the switch 19 during the time period E indicated in FIG. 6 to generate the deceleration pulse 10 illustrated in FIG. 6.

When the reading operation is switched from the second layer to the first layer, the selection of the selector switch 22 may be controlled in a reverse manner to the foregoing case, where the reading operation is switched from the first layer to the second layer. According to this control, the acceleration pulse 33 and the deceleration pulse 34 can be generated as illustrated in FIG. 8.

Figure 10:
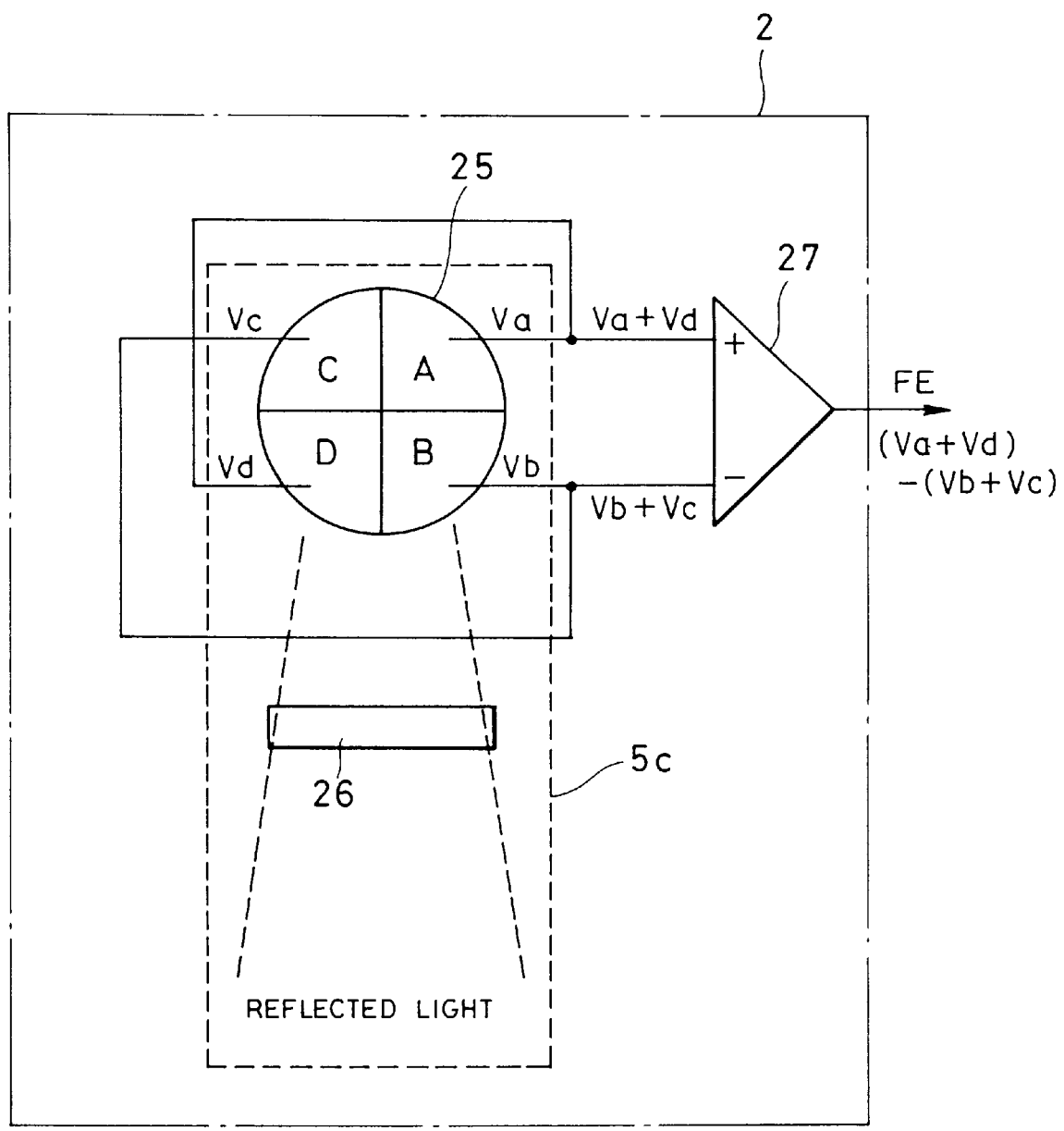
FIG. 10 is a diagram illustrating the configuration of a focus error signal generator means in the focus control apparatus according to the first embodiment of the present invention.

Next, a specific configuration of the focus error signal generator means 2 is illustrated in FIG. 10.

The focus error signal generator means 2 comprises a light receiving element 25 equally divided into four regions by two orthogonal division lines, an astigmatism generator means 26, and a differential amplifier 27.

Figure 7:
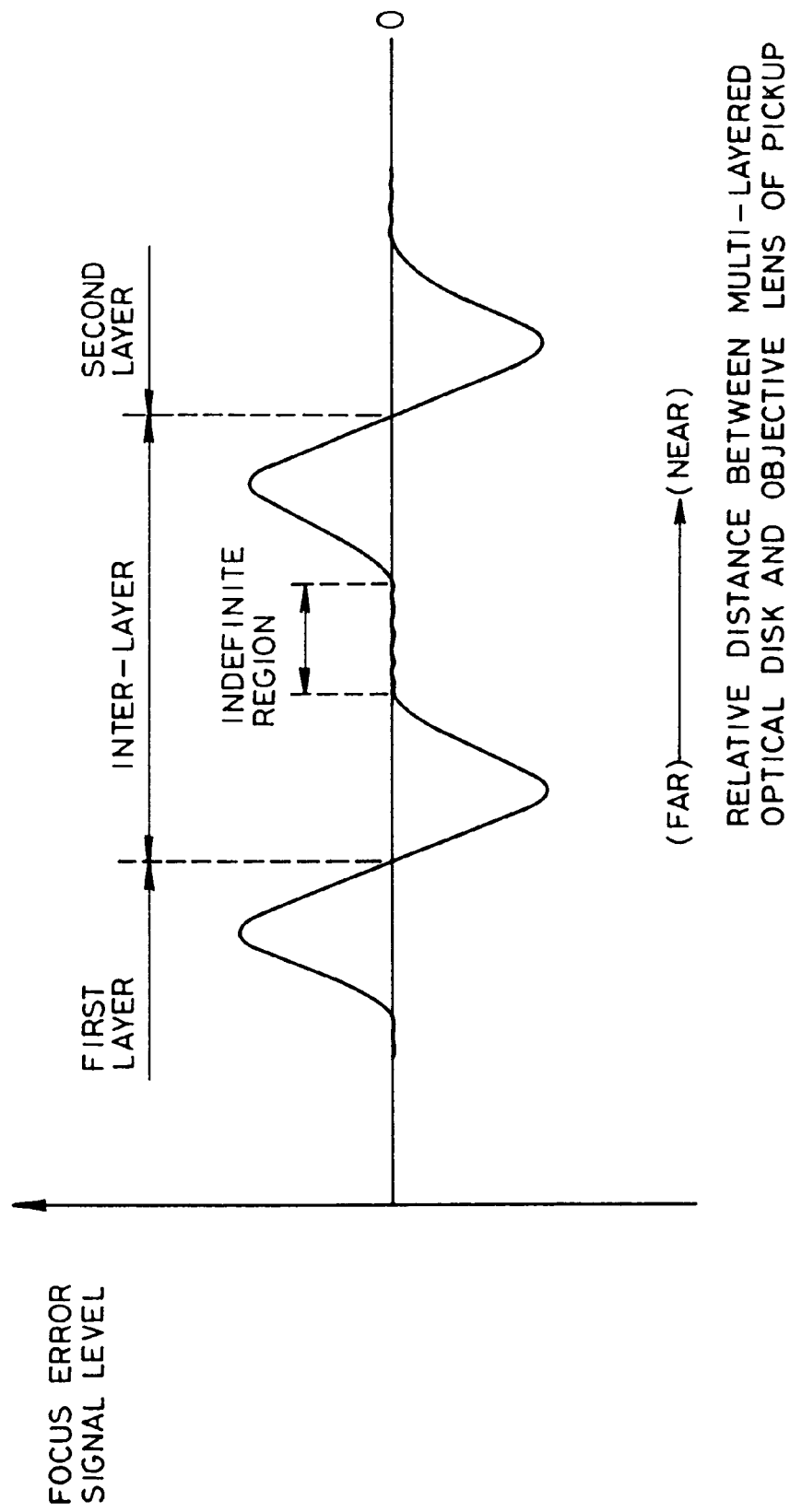
FIG. 7 shows an indefinite region of a focus error signal generated in accordance with a relative distance between a multi-layered optical disk and an objective lens of a pickup in the focus control apparatus according to the first embodiment of the present invention.

Reflected light from the multi-layered optical disk 8 is incident on respective divided regions A–D on the light receiving element 25 through the astigmatism generator means 26. Photoelectrically converted outputs Va, Vd generated by a pair of regions A, D positioned symmetrically to the orthogonal cross point of the division lines are added to generate a signal having a level (Va+Vd). Likewise, photoelectrically converted outputs Vb, Vc generated by the other pair of regions B, C are also added to generate a signal having a level (Vb+Vc). The difference between these signals thus generated is determined by the differential amplifier 27 to generate a signal having a level in accordance with the difference, i.e., the focus error signal as illustrated in FIG. 7.

Figure 11:
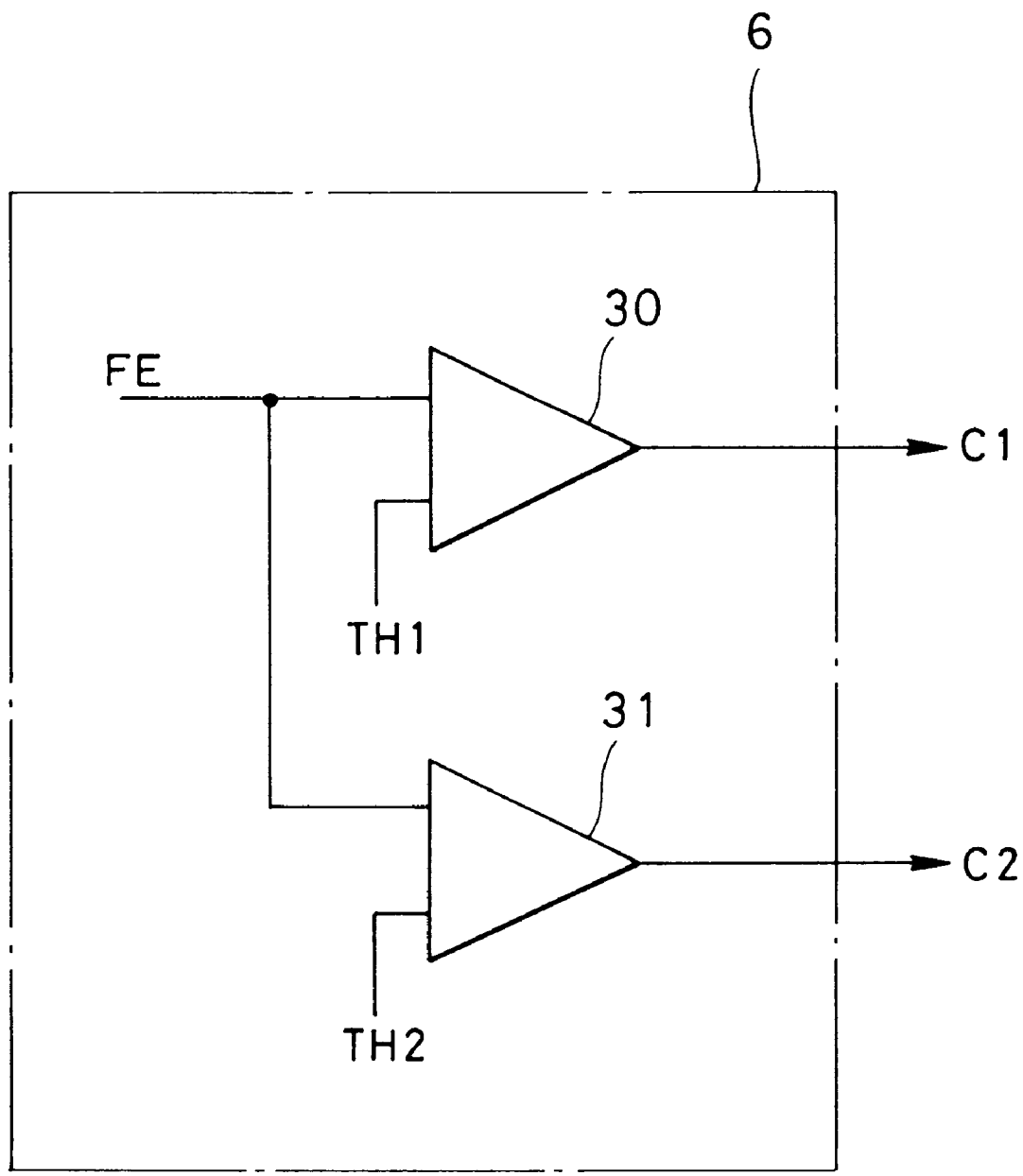
FIG. 11 is a diagram illustrating the configuration of a comparator means in the focus control apparatus according to the first embodiment of the present invention.

Next, a specific configuration of the comparator means 6 is illustrated in FIG. 11.

In FIG. 11, the comparator means 6 comprises comparators 30, 31 for comparing the focus error signal with two comparison reference levels. The comparator 30 has its reference level set at TH1, while the comparator 31 has its reference level set at TH2.

The control unit 7 controls the deceleration pulse and the signal selector means 3 for supplying the output of the focus error signal generator circuit 2 to the driving circuit 4, based on a comparison result (C1) of the comparator 30, when the reading operation is switched from the first layer to the second layer.

Conversely, when the reading operation is switched from the second layer to the first layer, the control unit 7 controls the deceleration pulse and the signal selector means 3 for supplying the output of the focus error signal generator means 2 to the driving circuit 4, based on a comparison result (C2) of the comparator 31.

Next, a second embodiment of the present invention will be described.

Figure 12:
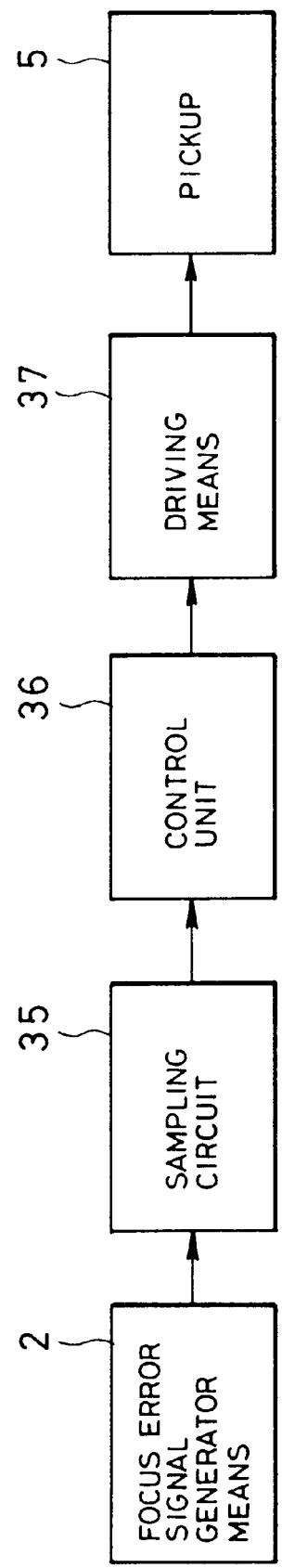
FIG. 12 is a schematic block diagram illustrating a focus control apparatus according to a second embodiment of the present invention.

FIG. 12 is a schematic block diagram illustrating a focus control apparatus according to the second embodiment of the present invention. In FIG. 12, the focus control apparatus comprises: a focus error signal generator means 2; a sampling circuit 35 for sampling the focus error signal output from the focus error signal generator means 2; a pickup 5; a driving means 37 for generating a driving output for driving an objective lens of the pickup 5; and a control unit 36 including a microprocessor and so on for deciding a driving value on the basis of a sampled value of the input focus error signal. The driving means 37 comprises a D/A convertor for converting an output digital driving value of the control unit 36 into analog form.

The operation of the control unit 36 in the focus control apparatus thus configured will be described with reference to FIG. 13 again in connection with the exemplary two-layered optical disk illustrated in FIG. 3.

Figure 13:
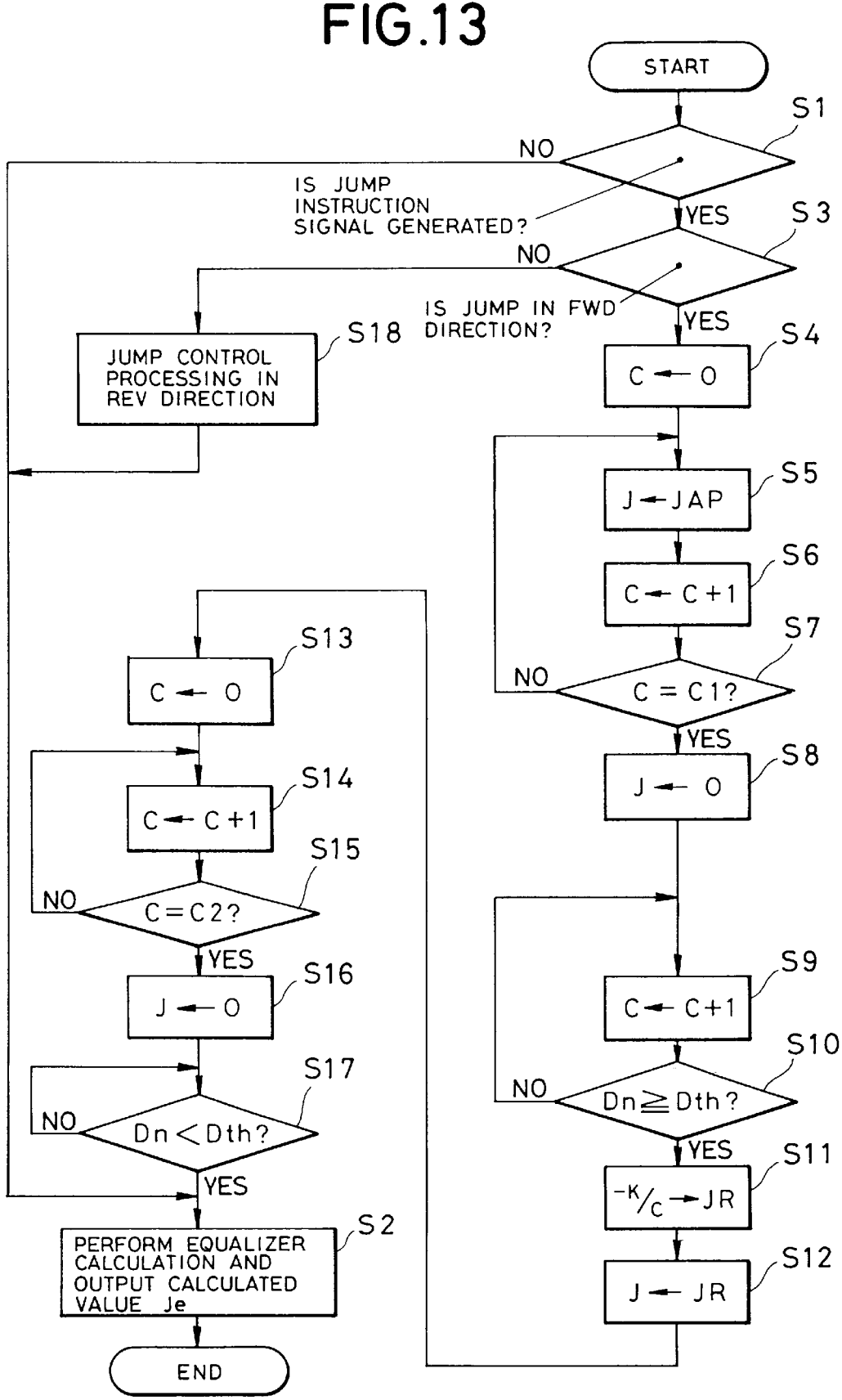
FIG. 13 is an operational flow chart representing a process performed by a control unit of the focus control apparatus according to the second embodiment of the present invention.

FIG. 13 is an operational flow chart representing the processing of the control unit 36.

The control unit 36 detects the presence or absence of an instruction (jump instruction) for switching a layer from which information is to be read at predetermined timing (step S1). When the switching jump instruction is present, the control unit 36 determines the contents of the instruction (step S3). Specifically, the control unit 36 determines whether the switching jump instruction indicates the switching of a reading operation from the first layer to the second layer (FWD direction) or the switching of a reading operation from the second layer to the first layer (REV direction).

When it is the switching jump instruction indicating the switching of a reading operation from the first layer to the second layer, a count value of a counter C provided in the control unit 36 is set to zero as an initial set value (step S4).

After the initial setting of the counter C, a driving value J is set to JAP which is output to the driving means 37 (step S5). After outputting the driving value JAP, the count value of the counter C is incremented by one (step S6). Here, the driving value JAP is a digital value corresponding to JAP indicated in FIG. 6 which is a preset driving value.

After incrementing the counter C, the control unit 36 determines whether or not the count value of the counter C has reached a predetermined value C1 (step S7). If the count value has not reached the set value C1, the flow goes back to step S5 to repeat the processing at steps S5 and S6 until the count value of the counter C reaches the set value C1. Here, the set value C1 has been preset so as to correspond to the time period T0 indicated in FIG. 6. When the count value of the counter C has reached the set value C1, the driving value J is changed to zero (step S8).

By the foregoing processing, the acceleration pulse 9 having the peak level JAP is output for the predetermined duration T0.

After outputting the acceleration pulse 9, the count value of the counter C is incremented by one (step S9), and then the control unit 36 determines whether or not a sampled value Dn of the focus error signal is equal to or more than a preset value Dth (step S10). Here, Dth is a value corresponding to the comparison reference value TH1 indicated in FIG. 6.

If the sampled value Dn is less than the set value Dth, the flow goes back to step S9, where the count value of the counter C is incremented by one, and then, the next sampled value Dn is compared again at step S10 in a similar manner.

At step S10, if the sampled value Dn is equal to or more than the set value Dth, an inverse of the count value is multiplied by –k based on the count value of the counter C, i.e., –k/C is calculated (step S11). Then, a driving value JP corresponding to this calculation result is output to the driving means 37 (step S12). Here, the constant k is a value corresponding to an output offset voltage of the offset voltage generator circuit 17 illustrated in FIG. 9, so that the driving value JR is set to a signal level corresponding to an inter-layer thickness of a disk by processing at steps S9–S12.

After outputting the driving value JR, the count value of the counter C is again reset to zero (step S13). Next, the count value of the counter C is incremented by one (step S14), and the control unit 36 determines whether or not the count value of the counter C has reached a set value C2 (step S15). If the count value has not reached the set value C2, the flow goes back to step S14 to repeat the same processing until the count value of the counter C reaches the set value C2.

Here, the set value C2 has been preset so as to correspond to the time period E indicated in FIG. 6. When the count value of the counter C has reached the set value C2, the driving value JR is changed to zero (step S16).

By the foregoing processing, the deceleration pulse 10 having a signal level –k/C is output for the predetermined time period E.

Next, after outputting the deceleration pulse 10, the control unit 36 determines whether or not the sampled value Dn of the focus error signal is less than the preset value Dth (step S17). When the sampled value Dn is equal to or more than Dth, the flow goes back to step S17 to determine the next sampled value in a similar manner.

When the sampled value Dn is less than Dth at step S17, an equalizer calculation is performed and a driving value Je corresponding to the calculation result is supplied to the driving means 37 (step S2).

In other words, a focus servo loop including the focus error signal generator means 2, the control unit 36, the driving means 37, and the pickup 5 is formed. Subsequently, until another switching jump instruction is detected at step S1, the focus control apparatus operates following the flow taking a NO branch at step S1 to perform the focus control with the driving value Je decided by the focus servo loop.

When a switching jump instruction for switching a reading operation from the second layer to the first layer (REV direction) is issued, the flow proceeds from step S3 to step S18. The processing at step S18 is the same as the foregoing processing executed when a switching jump instruction for switching a reading operation from the first layer to the second layer (FWD direction) is issued, except that the polarity of JAP, JR, Dth is opposite and that a less-than sign on greater-than sign for comparing Dth with a sampled value Dn is directed in the opposite direction, so that detailed description is omitted.

While the foregoing embodiment has been described in connection with a two-layered optical disk, the present invention is not limited to this particular medium. If the number of times the comparison result (C1 or C2) of the comparator means 6 in FIG. 5 rises or falls is counted, a focus control apparatus implementing the present invention can be realized also for an optical disk having three or more recording layers.

Also, while in the foregoing embodiment, the peak level of the deceleration pulse is variable, the present invention is not limited to this, and the pulse width of the deceleration pulse may be variable in correspondence to the inter-layer thickness.

Figure 14:
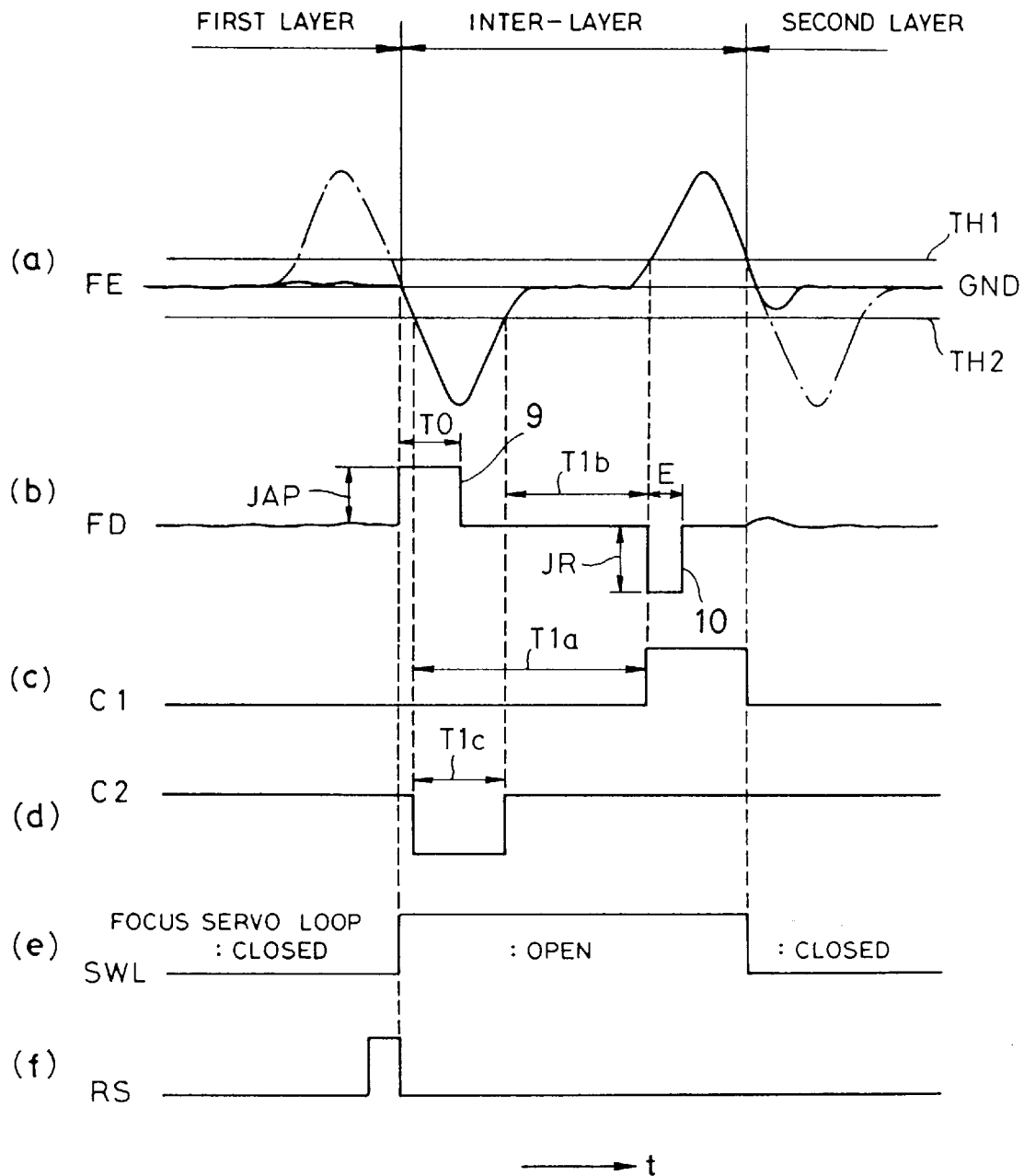
FIGS. 14(a–f) is a diagram showing an example of a parameter corresponding to an inter-layered thickness of a multi-layered optical disk set by the focus control apparatus of the present invention.
Figure 15:
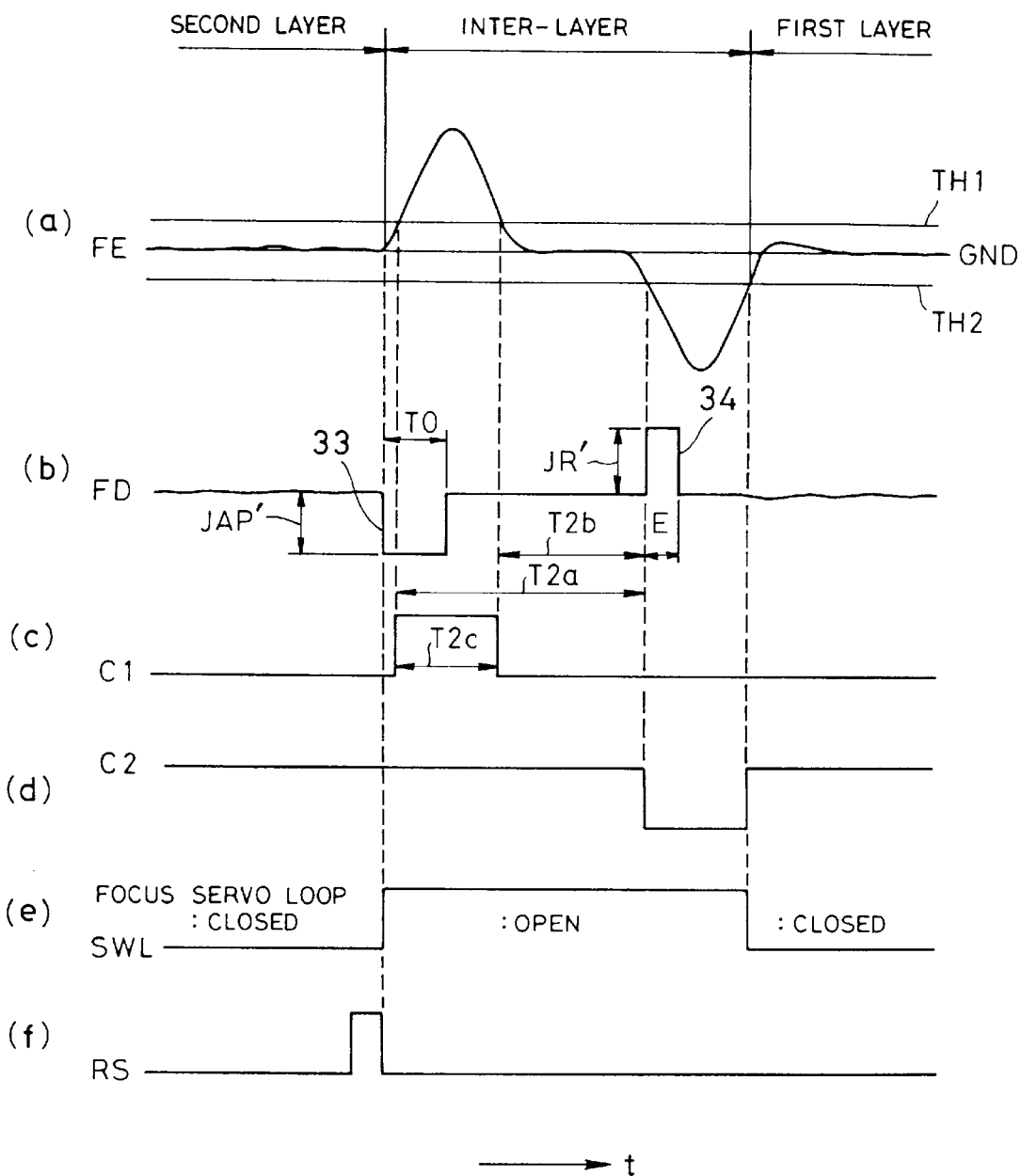
FIGS. 15(a–f) is a diagram showing another example of a parameter corresponding to an inter-layer thickness of a multi-layered optical disk set by the focus control apparatus of the present invention.

Further, while the foregoing embodiment employs, as a parameter corresponding to the inter-layer thickness, the time period T1 (or T2) between the time the switching jump instruction is issued and the time the sigmoid wave of the focus error signal associated with a recording surface from which information is to be read is generated, the present invention is not limited to this parameter. Alternatively, a time period corresponding to the indefinite region T1b (or T2b) may be employed as the parameter corresponding to the inter-layer thickness, as illustrated in FIGS. 14 and 15. Further alternatively, an elapsed time period T1a between the time the output C2 of the comparator 31 goes low and the time the output C1 of the comparator 30 goes high, or an elapsed time period T2a between the time the output C1 of the comparator 30 goes high and the time the output C2 of the comparator 31 goes low may also be employed as the parameter corresponding to the inter-layer thickness.

Further, for a very thin multi-layered optical disk having an inter-layer thickness standard value ranging approximately between 30 and 40 m, a time period T1c or T2c may be employed as the parameter corresponding to the inter-layer thickness. T1c is required for a sigmoid wave of the focus error signal associated with a recording surface, from which information has been read before the pickup jumps, to intersect with the level TH2 twice, and likewise, T2c is required for the sigmoid wave to intersect with the level TH1 twice, as indicated in FIGS. 14, 15.

Furthermore, when the focus servo loop is closed on a recording surface of destination to which the pickup is jumped, a focus sum signal output, as conventionally used, may be additionally considered as the criteria for determining whether the focus servo loop is closed.

Figure 16:
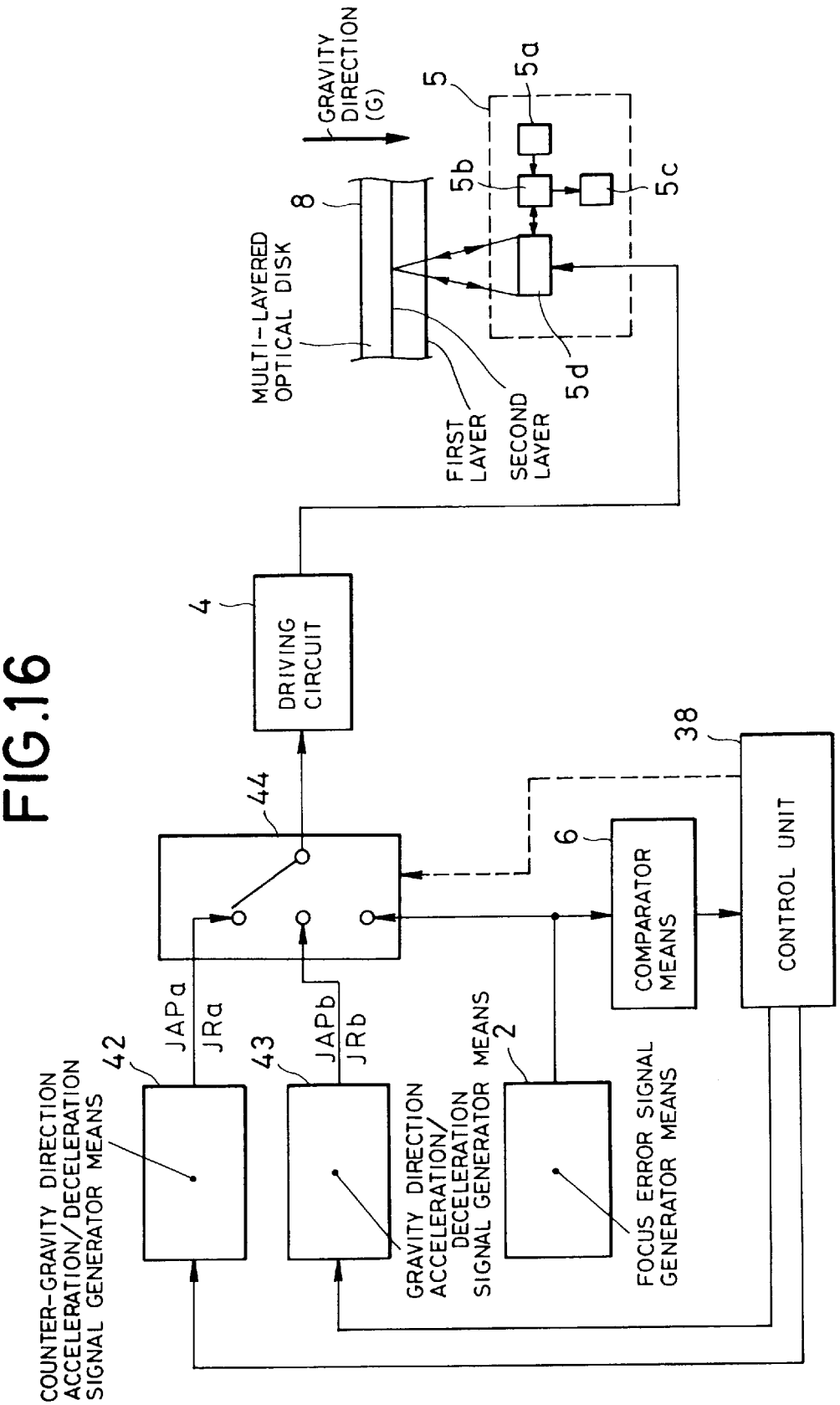
FIG. 16 is a schematic block diagram illustrating a focus control apparatus according to a third embodiment of the present invention.

Next, a third embodiment of the present invention will be described with reference to FIGS. 16–18. FIG. 16 is a schematic block diagram illustrating a focus control apparatus according to the third embodiment of the present invention, where components equivalent to those in the aforementioned FIG. 5 are designated by the same reference numerals and description thereon will be omitted.

In FIG. 16, the focus control apparatus comprises: a counter-gravity direction acceleration/deceleration signal generator means 42; a gravity direction acceleration/deceleration signal generator means 43; a focus error signal generator means 2; a signal selector means 44; a driving circuit 4; a pickup 5; a comparator means 6 for comparing a focus error signal with a reference level; and a control unit 38.

Assume that the pickup 5 is positioned below a multi-layered disk to read a first layer and a second layer of the multi-layered disk from beneath the disk, as illustrated in FIG. 16.

Thus, an objective lens arranged in the pickup 5 is to move in the counter-gravity direction when the objective lens is to move to the second layer while it is reading the first layer, and the objective lens is to move in the gravity direction when the objective lens is to move to the first layer while it is reading the second layer.

The counter-gravity direction acceleration/deceleration signal generator means 42 and the gravity direction acceleration/deceleration signal generator means 43 are respectively controlled by the control unit 38 to generate an acceleration pulse for moving the objective lens arranged in the pickup 5 and a deceleration pulse for decelerating a moving speed of the objective lens which is moving in accordance with the acceleration pulse.

The signal selector means 44, controlled by the control unit 38, selects the acceleration/deceleration pulses generated by the counter-gravity direction acceleration/deceleration signal generator means 42, the acceleration/deceleration pulses generated by the gravity direction acceleration/deceleration signal generator means 43, or the focus error signal generated by the focus error signal generator means 2, as required.

The driving circuit 4 outputs a driving output for driving a driving unit 5d of the pickup 5 in a focus direction on the basis of a signal selected by the signal selector means 44.

The control unit 38 controls the respective components of the focus control apparatus, based on information reproduced from a multi-layered optical disk 8 or based on a read layer switching instruction, not shown, input thereto from the user. Specifically, the control unit 38 controls output timing, output level, and output duration of the deceleration signal, based on the comparison result presented by the comparator means 6. The control unit 38 also controls output timing and output duration of the acceleration signal and the timing for selecting the focus error signal or the acceleration/deceleration signals in the counter-gravity direction or the acceleration/deceleration signals in the gravity direction.

More specifically, when the pickup 5 is to jump from the first layer to the second layer for a reading operation in FIG. 16, the control unit 38 controls the signal selector means 44 to supply the driving circuit 4 with an output signal from the counter-gravity direction acceleration/deceleration signal generator means 42. Conversely, when the pickup 5 is to jump from the second layer to the first layer for reading operation, the control unit 38 controls the signal selector means 44 to supply the driving circuit 4 with an output signal from the gravity direction acceleration/deceleration signal generator means 43.

Figure 17:
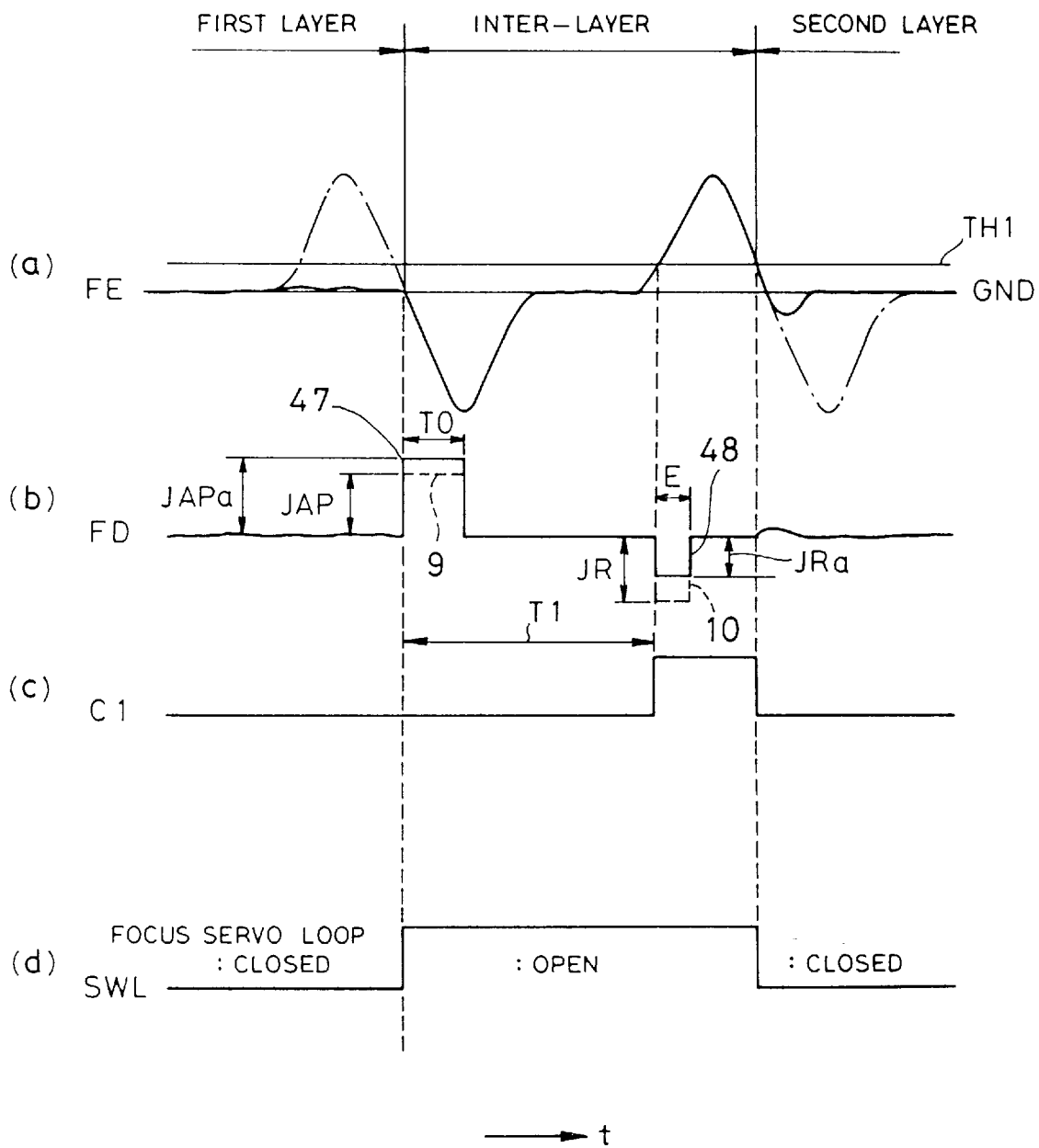
FIGS. 17(a–d) illustrates waveforms at a variety of positions in a reproducing apparatus employing the focus control apparatus according to the third embodiment of the present invention when a reading operation is switched from the first layer to the second layer by an instruction.

FIGS. 17($a$–$d$) illustrates waveforms at a variety of positions in the focus control apparatus, in correspondence to the waveforms at the variety of positions illustrated in FIG. 6, when the pickup 5 jumps from the first layer to the second layer for reading information recorded thereon in response to an instruction. As can be seen from FIG. 17, when the objective lens is moving closer to the disk 8 (i.e., moving upwardly), the driving unit 5d is influenced by gravity in the direction opposite to its accelerating direction, so that a peak value JAPa of an acceleration pulse 47 is set to a value larger than the peak level JAP of the acceleration pulse 9 illustrated in FIG. 6 by the portion corresponding to the gravitational influence on the driving unit 5d. Conversely, when the objective lens is braked, the driving unit 5d is influenced by gravity in the same direction as its decelerating direction, so that a peak value JRa of a deceleration pulse 48 is set to a value smaller than the peak level JR of the deceleration pulse 10 illustrated in FIG. 6 by a portion corresponding to the gravitational influence on the driving unit 5d.

Figure 18:
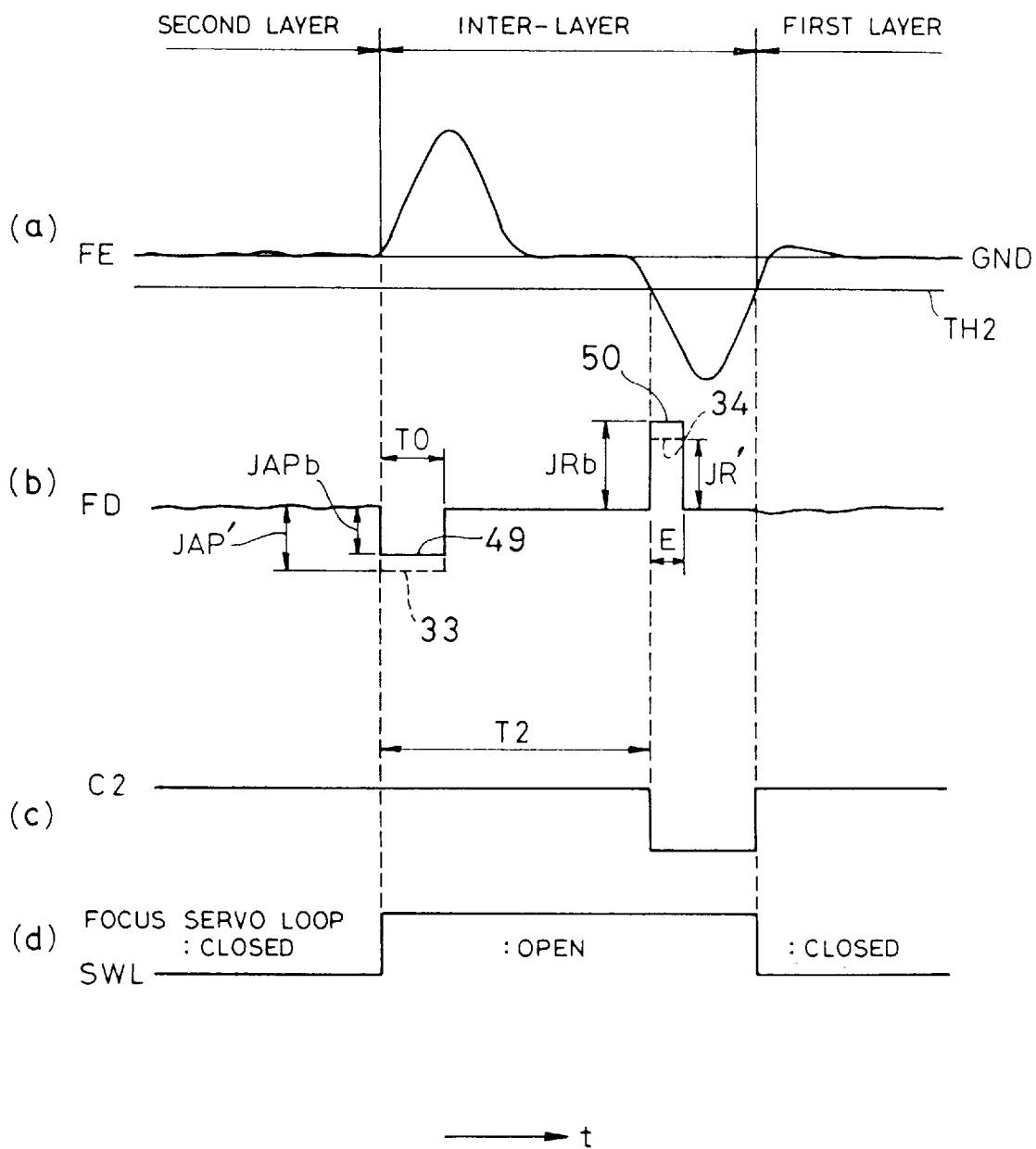
FIGS. 18(a–d) illustrates waveforms at a variety of positions in the reproducing apparatus employing the focus control apparatus according to the third embodiment of the present invention when a reading operation is switched from the second layer to the first layer by an instruction.

FIGS. 18($a$–$d$) illustrates waveforms at a variety of positions in the focus control apparatus, in correspondence to the waveforms at the variety of positions illustrated in FIG. 8, when the pickup 5 jumps from the second layer to the first layer for reading information recorded thereon in response to an instruction. In this event, the direction of the gravitational influence on the driving unit 5d is the same as the accelerating direction of the objective lens and opposite to the decelerating direction of the same. Thus, a peak value JAPb of an acceleration pulse 49 is set to a level lower than the peak level JAP' of the acceleration pulse 33 in FIG. 8 by a portion corresponding to the gravitational influence on the driving unit 5d, while a peak level JRb of a deceleration pulse 50 is set at a level correspondingly higher than the peak level JR' of the deceleration pulse 34 in FIG. 8 by a portion corresponding to the gravitational influence on the driving unit 5d.

As a result, when the driving unit 5d of the pickup 5 (the focus of the objective lens) jumps from the first layer to the second layer or from the second layer to the first layer, the influence of the gravitational acceleration on the driving unit 5d can be canceled. It is therefore possible to eliminate inconveniences, i.e., the focus of the objective lens of the pickup 5 passing beyond a target recording surface from which information is to be read, the focus not reaching the recording surface and causing the focus servo to fail, the pickup 5 moving extremely close to the multi-layered disk causing contact therebetween, and so on.

Figure 19:
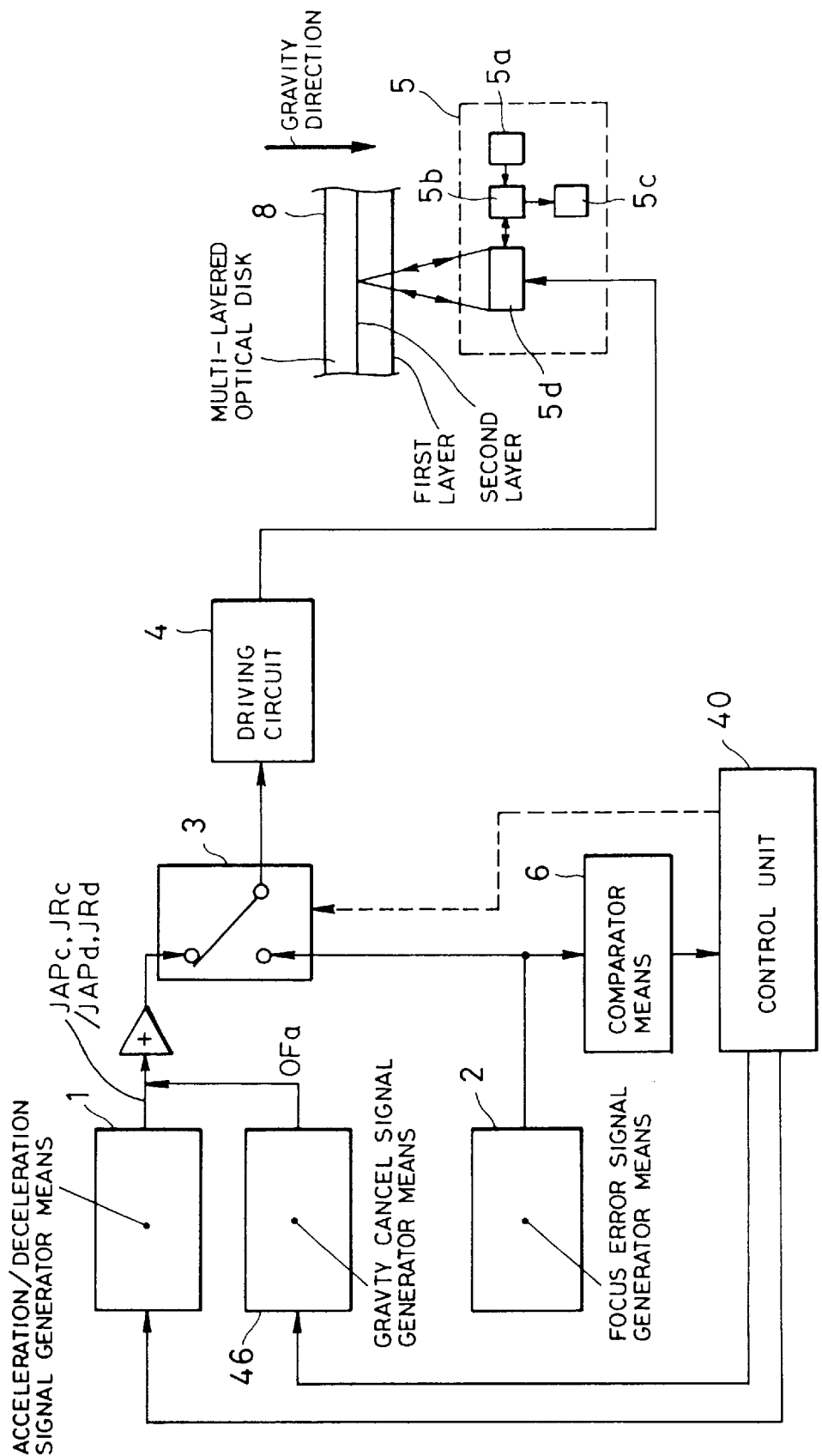
FIG. 19 is a schematic block diagram illustrating a focus control apparatus according to a fourth embodiment of the present invention.

As described above, in the third embodiment, when the focus of the objective lens is moved between the two layers, the control unit 38 appropriately selects one of output signals of the counter-gravity direction acceleration/deceleration signal generator means 42 or the gravity direction acceleration/deceleration signal generator means 43, depending on the direction of gravitational influence on the driving unit 5d and a moving direction of the objective lens. Alternatively, a gravity cancel signal generator means 46, as illustrated in FIG. 19 or a fourth embodiment, may be provided to realize a similar function to the above. Specifically, a control unit 40 controls the gravity cancel signal generator means 46 to generate a signal for appropriately canceling the gravity acting on a driving unit 5d in addition to the operation of the control unit 7 (see FIG. 5). Then, the cancel signal is added to a peak level of an acceleration pulse or a deceleration pulse when the objective lens is moved.

Figure 20:
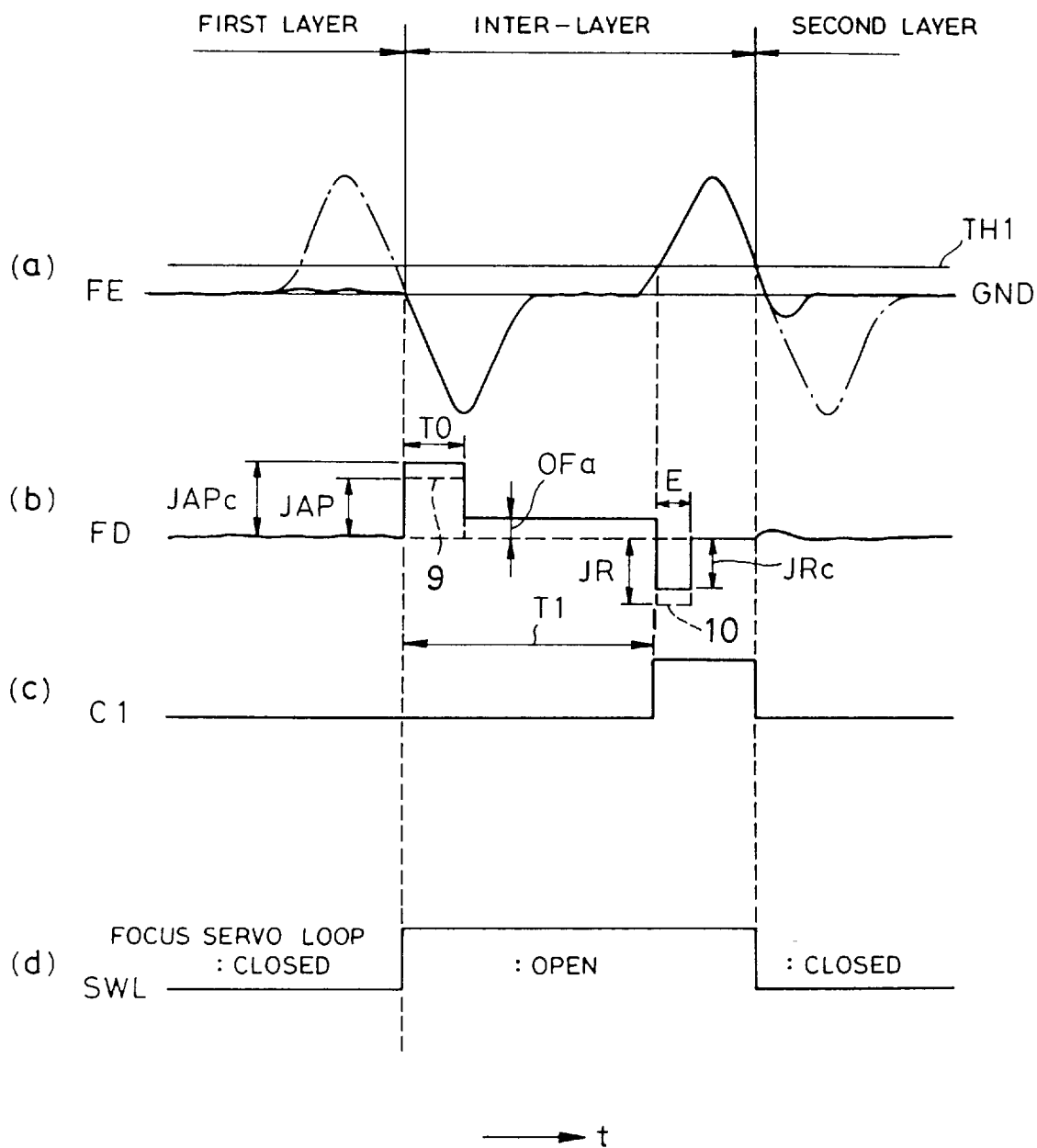
FIGS. 20(a–d) illustrates waveforms at a variety of positions in a reproducing apparatus employing the focus control apparatus according to the fourth embodiment of the present invention when a reading operation is switched from the first layer to the second layer by an instruction.
Figure 21:
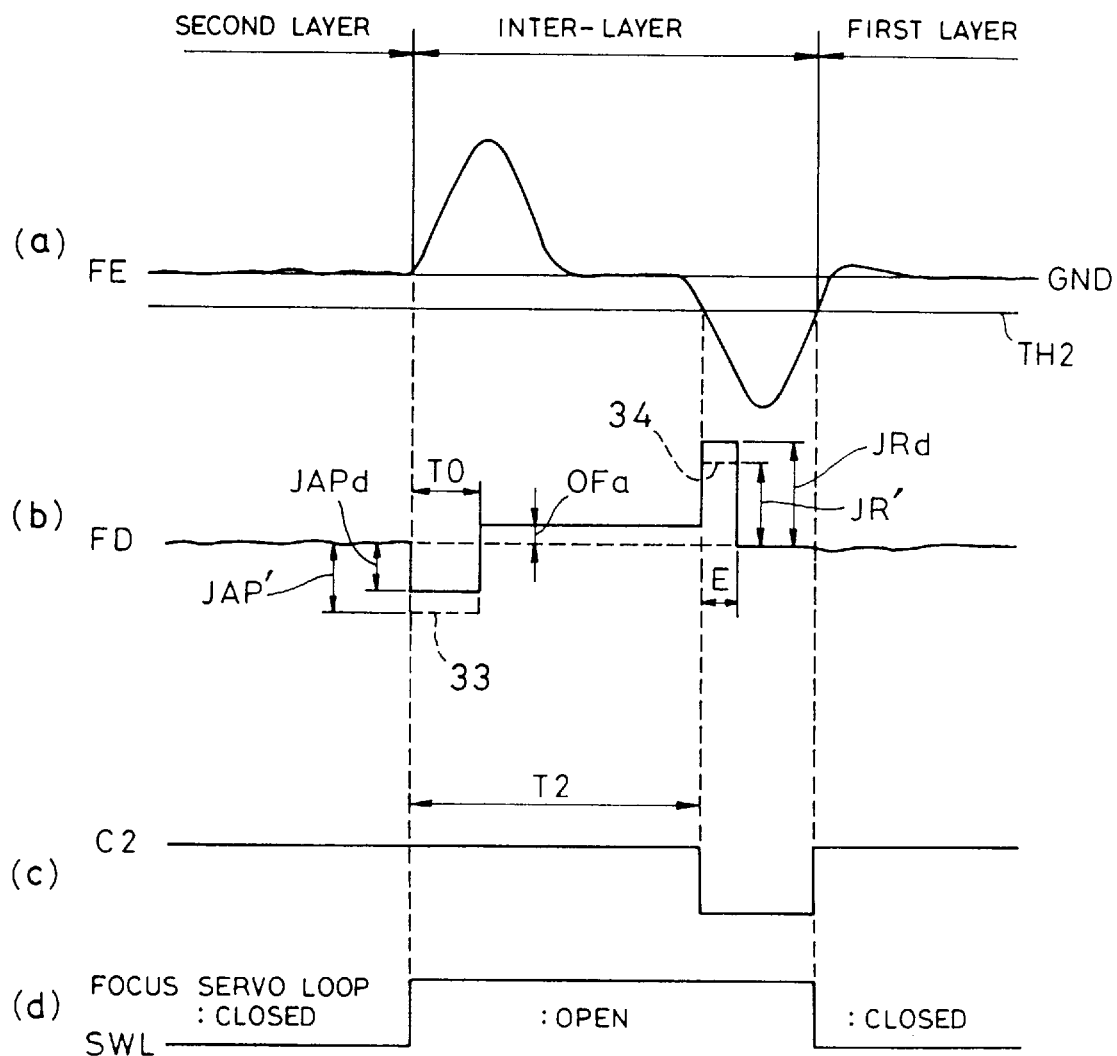
FIGS. 21(a–d) illustrates waveforms at a variety of positions in the reproducing apparatus employing the focus control apparatus according to the fourth embodiment of the present invention when a reading operation is switched from the second layer to the first layer by an instruction.

FIGS. 20(a–d) illustrates waveforms at a variety of positions in FIG. 19, i.e., in the fourth embodiment, in correspondence to the waveforms at the variety of positions illustrated in FIG. 6, when the pickup jumps from the first layer to the second layer for a reading operation in response to an instruction. FIGS. 21(a–d) illustrates waveforms at a variety of positions in the fourth embodiment in correspondence to the waveforms at the variety of positions illustrated in FIG. 8, when the pickup jumps from the second layer to the first layer for a reading operation in response to an instruction.

OFa in FIGS. 20 and 21 represents an output level of the gravity cancel signal generator means 46 which has a polarity determined to act in the direction opposite to the direction of gravity acting on the objective lens of the pickup 5. The output level OFa has a level equivalent to JAPa-JAP and JR-JRa in the third embodiment, thus achieving a similar effect to that of the third embodiment. The gravity cancel signal in FIG. 20 is a part of an acceleration pulse, and the gravity cancel signal in FIG. 21 is a part of a deceleration pulse, respectively in a broad sense.

While the third and fourth embodiments have been described in connection with an example in which the pickup 5 is positioned below the multi-layered optical disk, the pickup 5 may be positioned above the multi-layered optical disk as the aforementioned first embodiment. In this case, the respective acceleration pulse and deceleration pulse for driving the driving unit 5d as well as the gravity cancel signal have their levels set on the assumption that the direction of gravity acting on the driving unit 5d is opposite.

Figure 22:
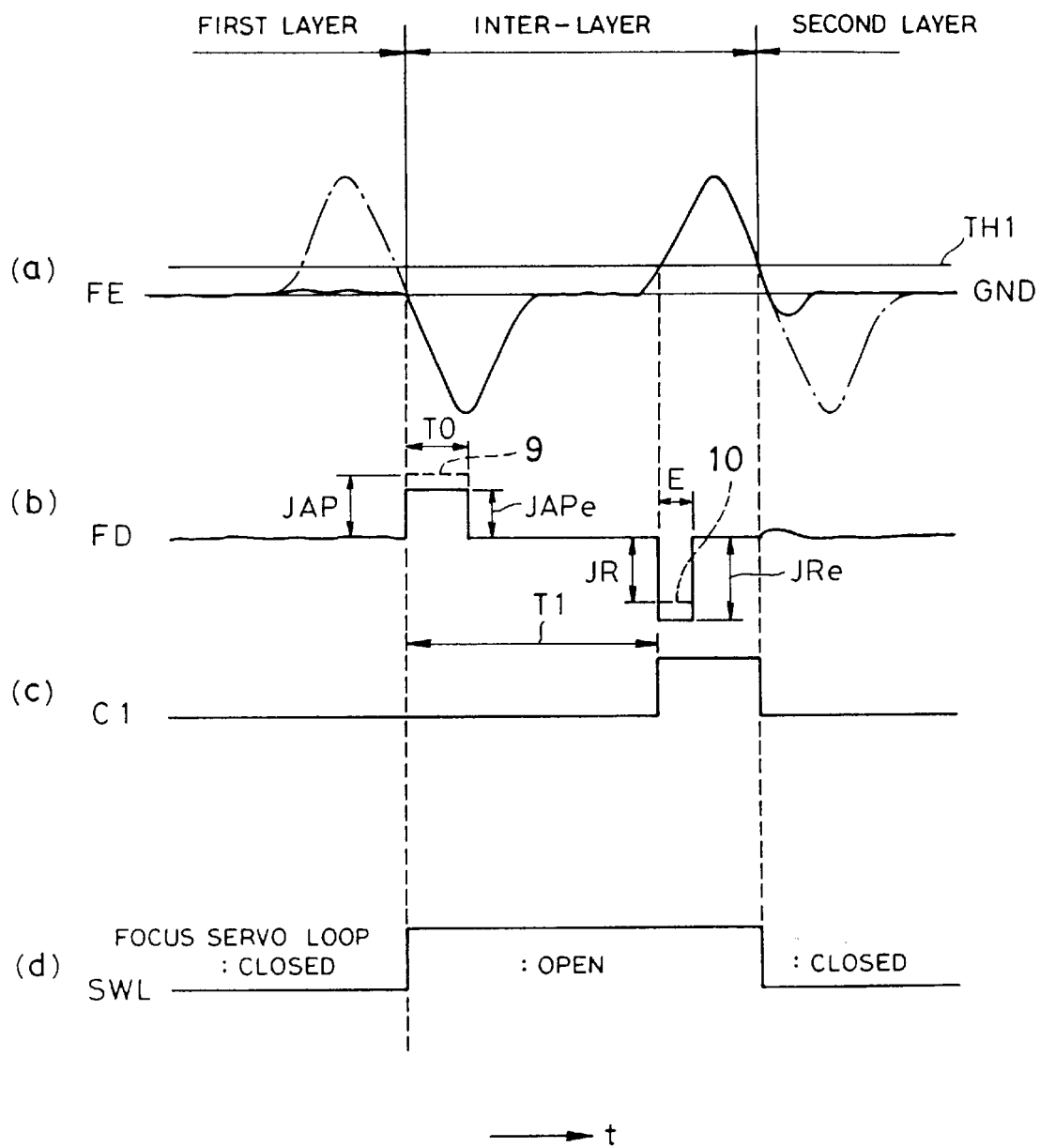
FIGS. 22(a–d) illustrates waveforms at a variety of positions in a reproducing apparatus employing the focus control apparatus according to a fifth embodiment of the present invention when a reading operation is switched from the first layer to the second layer by an instruction.
Figure 23:
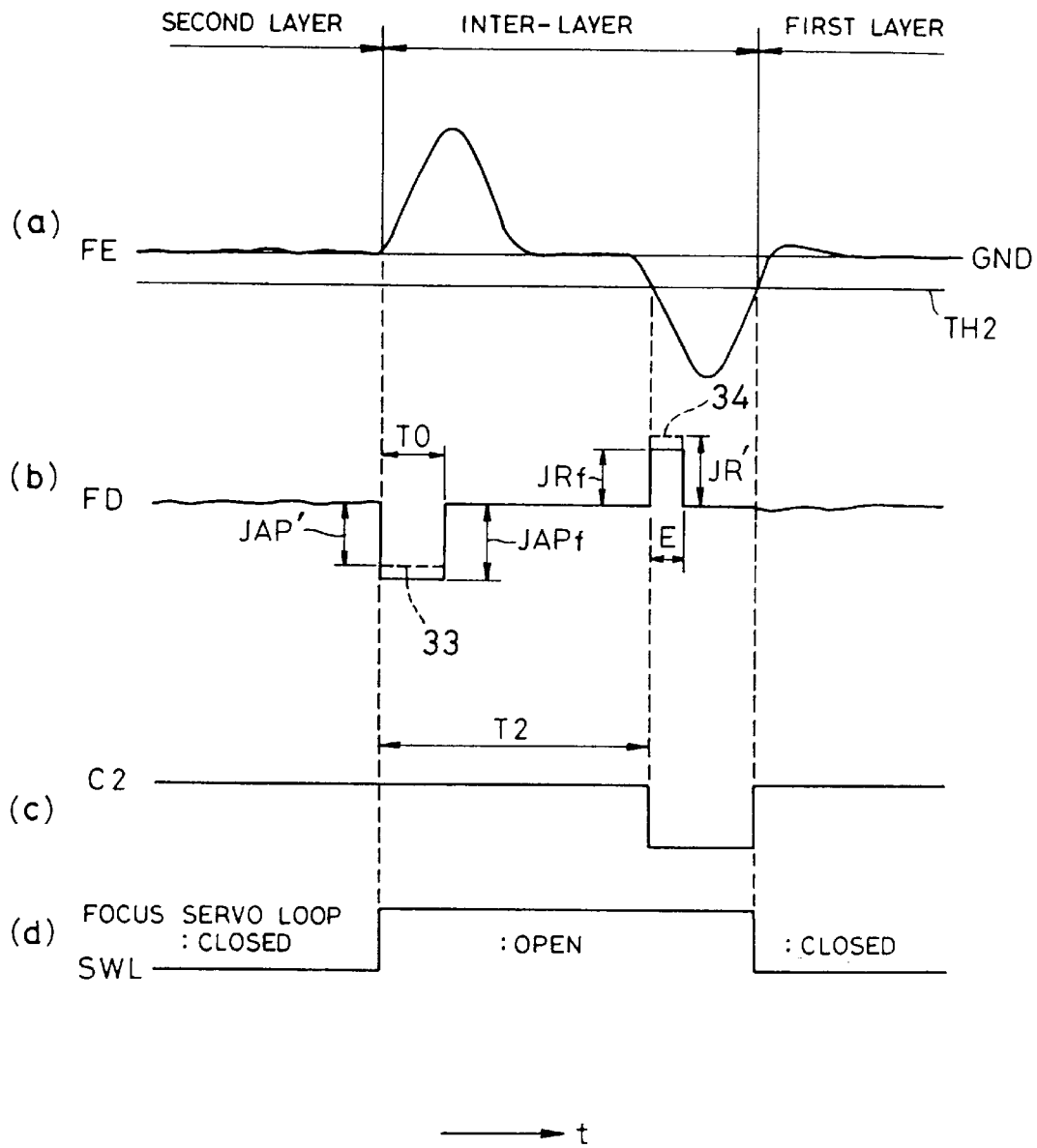
FIGS. 23(a–d) illustrates waveforms at a variety of positions in the reproducing apparatus employing the focus control apparatus according to the fifth embodiment of the present invention when a reading operation is switched from the second layer to the first layer by an instruction.

FIGS. 22(a–d) and 23(a–d) illustrate a fifth embodiment of the present invention, which is a modified example of the third embodiment, where a pickup 5 is positioned above a multi-layered optical disk. Specifically, FIGS. 22(a–d) and 23(a–d) illustrate operational waveforms observed when a reading point of the pickup 5 is moved between two layers. FIGS. 22(a–d) illustrates waveforms corresponding to those in FIGS. 17(a–d), and FIGS. 23(a–d) illustrates waveforms corresponding to those in FIGS. 18(a–d).

Figure 24:
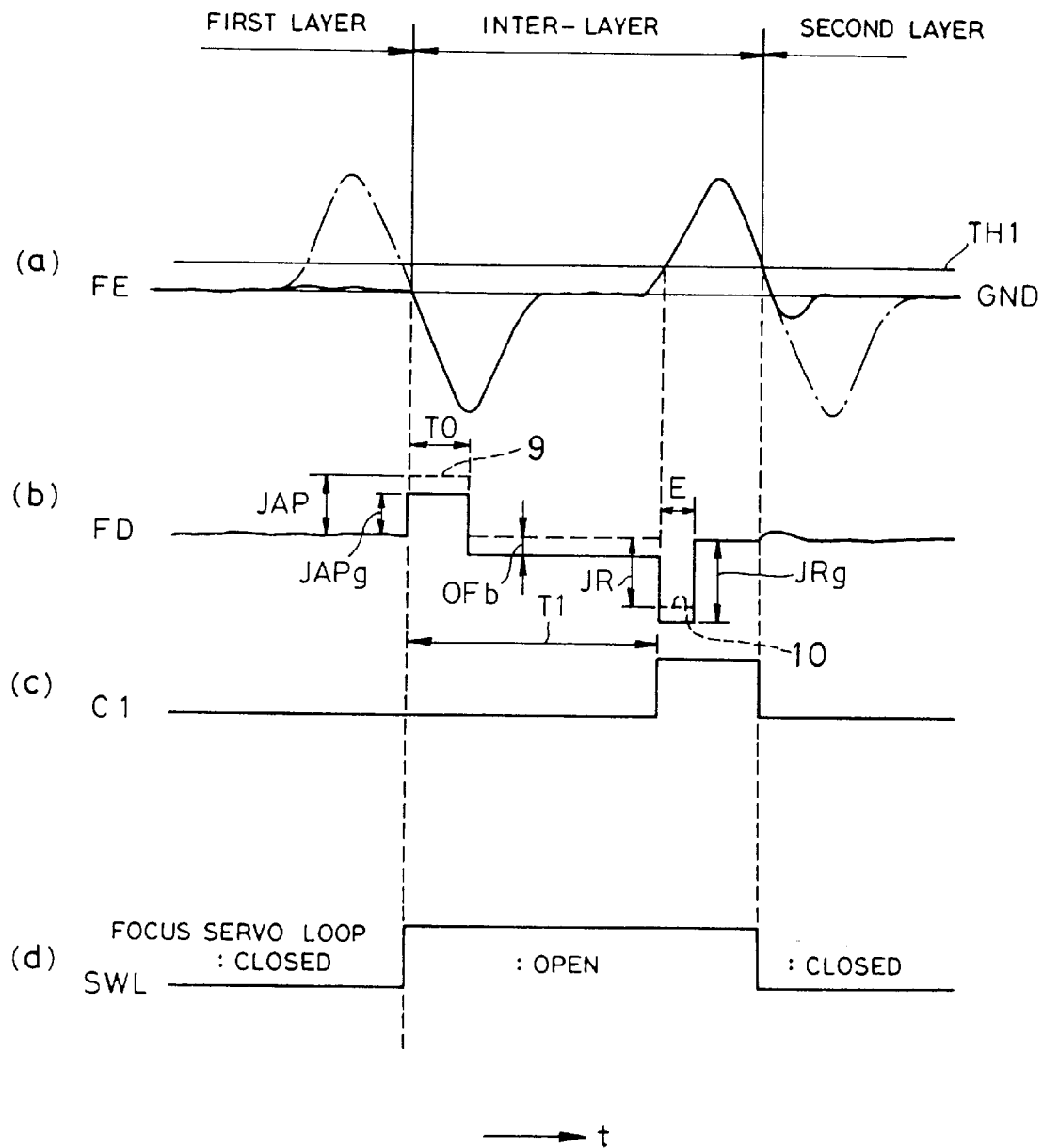
FIGS. 24(a–d) illustrates waveforms at a variety of positions in a reproducing apparatus employing the focus control apparatus according to a sixth embodiment of the present invention when a reading operation is switched from the first layer to the second layer by an instruction.
Figure 25:
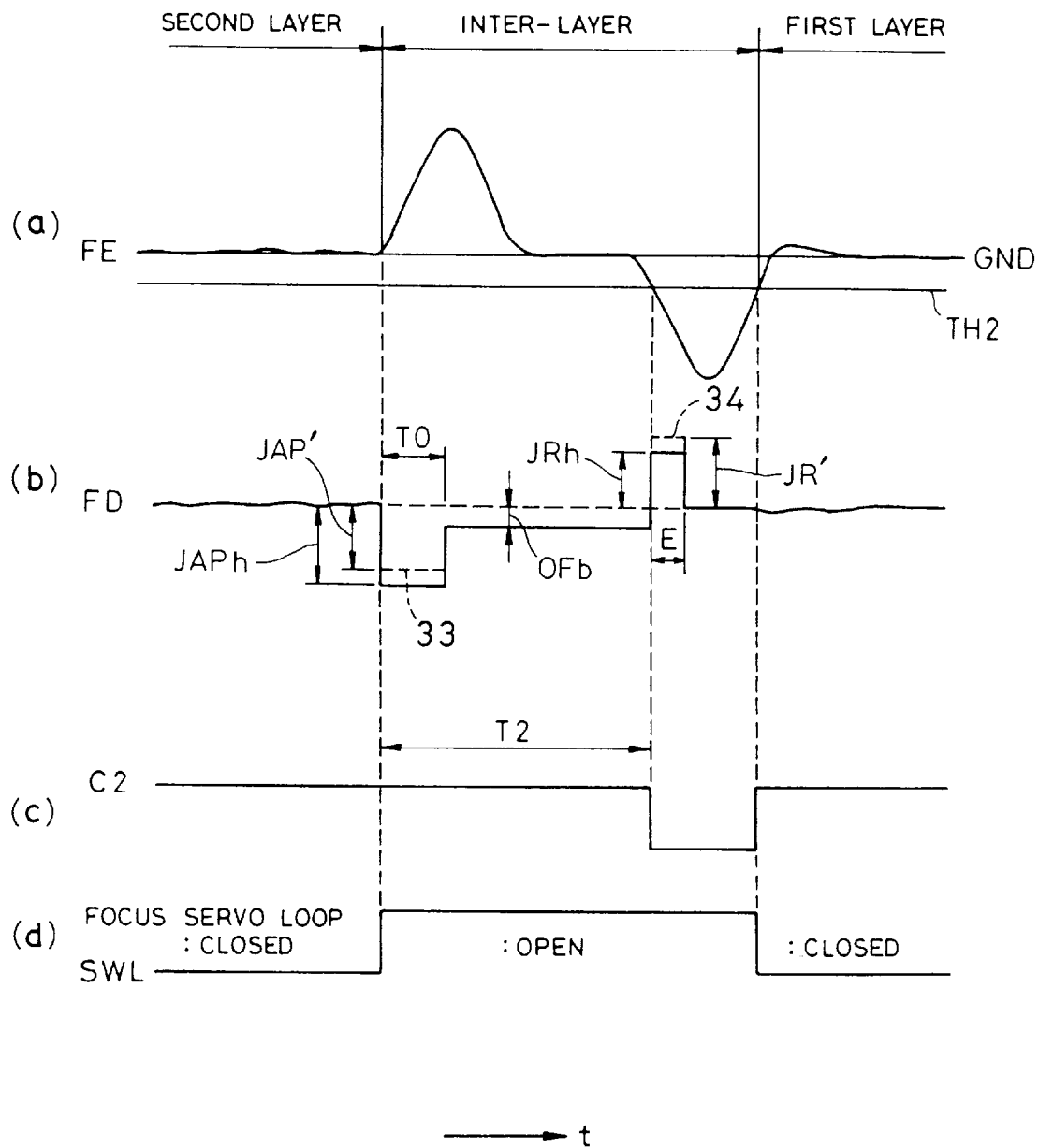
FIGS. 25(a–d) illustrates waveforms at a variety of positions in the reproducing apparatus employing the focus control apparatus according to the sixth embodiment of the present invention when a reading operation is switched from the second layer to the first layer by an instruction.

FIGS. 24(a–d) and 25(a–d) illustrate a sixth embodiment of the present invention, which is a modified example of the fourth embodiment, where a pickup 5 is positioned above a multi-layered optical disk. FIGS. 24(a–d) and 25(a–d) illustrate operational waveforms observed when a reading point of the pickup 5 is moved between two layers. FIGS. 24(a–d) illustrates waveforms corresponding to those in FIG. 20, and FIGS. 25(a–d) illustrates waveforms corresponding to those in FIG. 21.

It should be noted that the direction of the gravitational pull on the objective lens of the pickup 5 may change or vary while a reproducing apparatus is reproducing information. For example, this is true when a reproducing apparatus including the pickup 5 is a portable type player which can be positioned at an arbitrary angle with respect to the direction of the gravity. Also, in case that information is read from a double face readable multi-layered disk having a plurality of recording layers respectively on the front surface side and on the back surface side, the direction of the gravity applied to the objective lens changes when the pickup 5, after the completion of a reading operation from one surface side, is rotated to the other surface from which information is continuously read.

Figure 26:
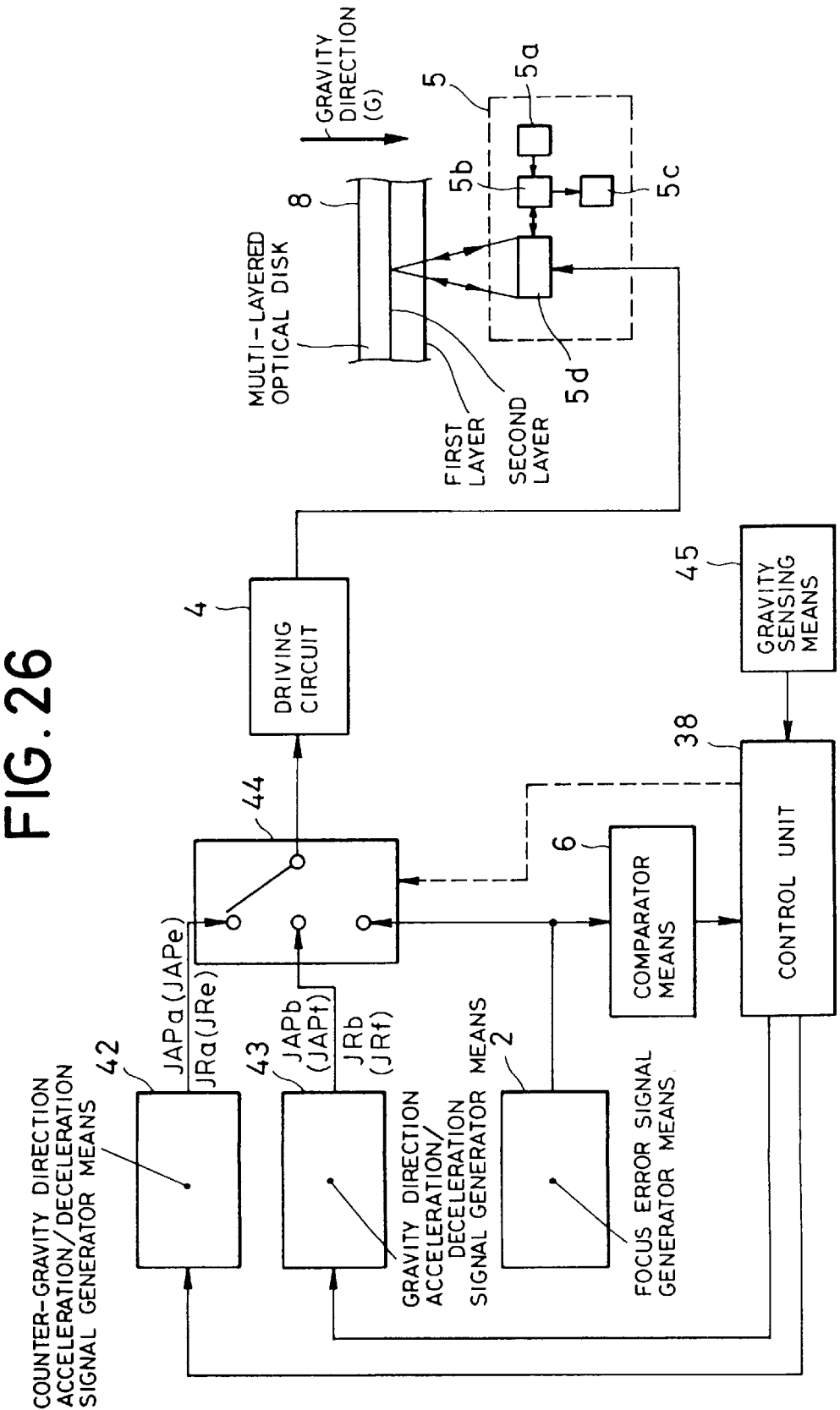
FIG. 26 is a schematic block diagram illustrating a focus control apparatus according to another embodiment of the present invention.

In such a case, the configuration of the apparatus preferably comprises a gravity sensing means 45 in addition to the configuration of FIG. 16, for example, as illustrated in FIG. 26. More specifically, the gravity sensing means 45 is used to sense the direction of the gravity applied to the objective lens of the driving unit 5d and to output the sensing result to the control unit 38 which in turn controls the level of the acceleration pulse or the deceleration pulse of the counter-gravity direction acceleration/deceleration signal generator means 42 or the gravity direction acceleration/deceleration signal generator means 43, and controls the switching of the signal selector means 44 in response to the sensing result, as illustrated in FIGS. 17, 18, 22, and 23. Alternatively, the focus control apparatus may additionally comprise the gravity sensing means 45 in addition to the configuration of FIG. 19, for example, as illustrated in FIG. 27. Specifically, the gravity sensing means 45 senses the direction of the gravity applied to the objective lens of the driving unit 5d and outputs the sensing result to the control unit 40 which in turn controls the output of the gravity cancel signal generator means 46 depending on the sensing result, as illustrated in FIGS. 20, 21, 24, and 25.

The gravity sensing means 45 may be configured such that, for example, the user is instructed to specify an angle, at which the reproducing apparatus including the pickup 5 is positioned with respect to the direction of the gravity, to enable the gravity sensing means 45 to determine the direction of the gravity based on this information specifying the angle. Also, in case that information is read from both surfaces of the disk illustrated in FIG. 4, the control unit can recognize from the transition of the pickup operation whether the pickup is positioned above or beneath the disk, thus making it possible to determine the direction of the gravity from the information on the position of the pickup.

While the respective embodiments illustrated in FIGS. 16–27 have been described in connection with a two-layered optical disk having two recording surfaces formed on a single side or on both sides, the present invention is not limited to this particular recording medium. The present invention can be further modified as a focus control apparatus for an optical disk having three or more recording surfaces on a single surface side.

Also, in the third embodiment, while the peak level of the acceleration pulse or the deceleration pulse (or an effective output level of the acceleration or deceleration signal) is varied for canceling the influence of the gravity on the driving unit 5d, the pulse width of the acceleration pulse or a deceleration pulse (i.e., an output duration of the acceleration signal or the deceleration signal) may be varied instead. Also, a similar effect can be produced by appropriately adjusting both of the output level and the output duration of the associated signal.

As described above in detail, in the present invention, when a focus servo is switched from one recording surface of a multi-layered optical disk, from which information is being read, to another target recording surface to reproduce information therefrom, a focus servo loop is once opened, an acceleration signal for acceleratively driving an objective lens toward the target recording surface is given to the pickup to move the reading point, and thereafter, a deceleration signal set in accordance with an inter-layer thickness between the recording surface from which information has been read and the target recording surface is given to the pickup to decelerate the movement of the objective lens so that the focus servo loop is closed on the target recording surface. Accordingly, incident light from the pickup can be reliably converged on the target recording surface.

Also, when the focus servo is switched from one recording surface of a multi-layered optical disk, from which information is being read, to another, target recording surface to reproduce information therefrom, the waveform of an acceleration signal or a deceleration signal generated by an acceleration/deceleration signal generator means is appropriately set in accordance with a moving direction of an objective lens, so that the acceleration signal or the deceleration signal can cancel the influence of the gravitational acceleration exerted on the objective lens, thus making it possible to perform a focus control for reliably converting or focusing incident light from the objective lens on a target recording surface.

What is claimed is:

1. A focus control apparatus in a reading apparatus for reading a multi-layered optical disk having information recorded on a plurality of recording surfaces thereof, comprising:

an objective lens for converging a light beam emitted from a light source on either of said recording surfaces;

driving means for moving said objective lens in an optical axis direction of said light beam in accordance with a driving signal;

light receiving means for receiving the light beam reflected from said multi-layered optical disk;

focus error detector means for detecting a focus error of said light beam with respect to one of the recording surfaces on the basis of a light receiving output of said light receiving means to generate a focus error signal;

signal generator means for generating an acceleration signal for forcing said objective lens to move in the optical axis direction of said light beam and a deceleration signal for braking said objective lens which has been forced to move; and control means for supplying said driving means with said acceleration signal and said deceleration signal as said driving signal in response to a switching instruction for switching the recording surface from which information is to be read from the one recording surface to a target recording surface, and for supplying said driving means with said focus error signal as said driving signal after generation of said deceleration signal, to converge said light beam on the target recording surface, wherein said deceleration signal is a signal indicative of a distance between the one recording surface which has been read before said switching instruction is issued and the target recording surface.

2. A focus control apparatus according to claim 1, wherein said deceleration signal is a signal indicative of a time period between an instant substantially when said switching instruction is issued and an instant a level of said focus error signal exceeds a predetermined threshold.

3. A focus control apparatus according to claim 1, wherein said deceleration signal is generated at a time said focus error signal exceeds a predetermined threshold for a first time after said switching instruction was issued.

4. A focus control apparatus according to claim 1, wherein said deceleration signal is a signal indicative of a time period between an instant substantially when a level of said focus error signal exceeds a predetermined first threshold and an instant the level of said focus error signal exceeds a predetermined second threshold.

5. A focus control apparatus according to claim 1, wherein said deceleration signal is generated when a level of said focus error signal exceeds a predetermined second threshold for a first time after the level of said focus error signal exceeds a predetermined first threshold.

6. A focus control apparatus according to claim 1, wherein at least one of said acceleration signal and said deceleration signal is adjusted to compensate for a force of gravity acting on said objective lens.

7. A focus control apparatus according to claim 1, wherein said deceleration signal has a peak level indicative of a distance between the one recording surface which has been read before said switching instruction is issued and the target recording surface.

8. A focus control apparatus in a reading apparatus for reading a multi-layered optical disk having information recorded on a plurality of recording surfaces thereof, comprising:

an objective lens for converging a light beam emitted from a light source on one of said plurality of recording surfaces;

driving means for moving said objective lens in an optical axis direction of said light beam in response to a driving signal;

light receiving means for receiving the light beam reflected from said multi-layered optical disk;

focus error detector means for detecting a focus error of said light beam with respect to one of the recording surfaces on the basis of a light receiving output of said light receiving means to generate a focus error signal;

signal generator means for generating an acceleration signal for forcing said objective lend to move in the optical axis direction of said light beam and a deceleration signal for braking said objective lens which has been forced to move; and control means for supplying said driving means with said acceleration signal and said deceleration signal as said driving signal in response to a switching instruction for switching the recording surface from which information is to be read from a present recording surface to a target recording surface, and for supplying said driving means with said focus error signal as said driving signal after generation of said deceleration signal, to converge said light beam on the target recording surface, wherein at least one of said acceleration signal and said deceleration signal is adjusted to compensate for a force of gravity acting on said objective lens.

9. A focus control apparatus according to claim 8, wherein said signal generator means generates an acceleration signal which is adjusted to compensate for the force of gravity acting on said objective lens when said objective lens is forced to move in the optical axis direction of said light beam and a deceleration signal which is adjusted to compensate for the force of gravity acting on said objective lens when said objective lens, forced to move, is braked.

10. A focus control apparatus according to claim 8, further comprising means for generating an offset signal at a level corresponding to the force of gravity acting on said objective lens, wherein at least one of said acceleration signal and said deceleration signal generated by said signal generator means is added to said offset signal.

11. A focus control apparatus according to claim 8, further comprising gravity sensing means for sensing a direction of a force of gravity exerted on said objective lens, wherein a sensing result is used for controlling a level of at least one of said acceleration signal and said deceleration signal.

* * * * *